US008149737B2

(12) United States Patent
Metke et al.

(10) Patent No.: US 8,149,737 B2
(45) Date of Patent: Apr. 3, 2012

(54) METHOD AND SYSTEM FOR DATA TRANSMISSION IN A WIRELESS NETWORK

(75) Inventors: Anthony R. Metke, Naperville, IL (US); Aparna Pandey, Chicago, IL (US); Joseph E. Phillips, Huntley, IL (US); Christopher G. Ware, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1619 days.

(21) Appl. No.: 11/199,783

(22) Filed: Aug. 9, 2005

(65) Prior Publication Data

US 2007/0036089 A1 Feb. 15, 2007

(51) Int. Cl.
*H04L 12/44* (2006.01)
(52) U.S. Cl. .................. 370/256; 709/252; 370/280
(58) Field of Classification Search .......... 370/254–256, 370/276–278, 280, 294, 310, 314, 326, 329, 370/336, 345, 347–348, 431, 439, 442, 443, 370/445, 446, 458; 709/208, 223, 226, 230, 709/238, 240, 241, 242, 244, 252
See application file for complete search history.

(56) References Cited

U.S. PATENT DOCUMENTS

| | | | | |
|---|---|---|---|---|
| 4,864,559 A * | 9/1989 | Perlman | ...................... | 370/256 |
| 5,606,669 A * | 2/1997 | Bertin et al. | .................. | 709/223 |
| 6,728,257 B1 * | 4/2004 | Bharghavan et al. | ......... | 370/458 |
| 6,728,514 B2 * | 4/2004 | Bandeira et al. | ............. | 455/13.1 |
| 6,751,248 B1 * | 6/2004 | Tan | ................................ | 375/132 |
| 6,934,752 B1 * | 8/2005 | Gubbi | .......................... | 709/225 |
| 7,126,937 B2 * | 10/2006 | Crosbie et al. | ................ | 370/350 |
| 7,142,527 B2 * | 11/2006 | Garcia-Luna-Aceves | .... | 370/336 |
| 7,164,704 B1 * | 1/2007 | Dabak et al. | ................... | 375/133 |
| 7,818,018 B2 * | 10/2010 | Nanda et al. | ................... | 455/509 |
| 2002/0044549 A1 * | 4/2002 | Johansson et al. | ............ | 370/386 |
| 2002/0062236 A1 * | 5/2002 | Murashita et al. | ................ | 705/5 |
| 2002/0064134 A1 * | 5/2002 | Lee et al. | ....................... | 370/252 |
| 2002/0071448 A1 * | 6/2002 | Cervello et al. | ............... | 370/445 |
| 2002/0105970 A1 * | 8/2002 | Shvodian | ....................... | 370/468 |
| 2002/0150050 A1 * | 10/2002 | Nathanson | .................... | 370/241 |
| 2002/0163933 A1 * | 11/2002 | Benveniste | .................... | 370/465 |
| 2002/0183004 A1 * | 12/2002 | Fulton et al. | ..................... | 455/41 |
| 2003/0058829 A1 * | 3/2003 | Batra | ............................ | 370/345 |
| 2003/0063619 A1 * | 4/2003 | Montano et al. | ............... | 370/443 |
| 2003/0081603 A1 * | 5/2003 | Rune | .............................. | 370/390 |
| 2003/0126299 A1 * | 7/2003 | Shah-Heydari | ............... | 709/252 |
| 2003/0152059 A1 * | 8/2003 | Odman | .......................... | 370/338 |
| 2003/0235158 A1 * | 12/2003 | Lee et al. | ....................... | 370/256 |
| 2004/0003111 A1 * | 1/2004 | Maeda et al. | .................. | 709/237 |
| 2004/0004973 A1 * | 1/2004 | Lee | ................................ | 370/445 |
| 2004/0081152 A1 * | 4/2004 | Thubert et al. | ................ | 370/392 |
| 2004/0090943 A1 * | 5/2004 | da Costa et al. | .............. | 370/338 |
| 2004/0166812 A1 * | 8/2004 | Lumelsky | .................. | 455/67.11 |

(Continued)

*Primary Examiner* — Aung S Moe
*Assistant Examiner* — Curtis A Alia
(74) *Attorney, Agent, or Firm* — Indira Saladi; Anthony P. Curtis; Daniel R. Bestor

(57) ABSTRACT

A method and system for data transmission by computational devices in a wireless network (100) are disclosed. A computational device (102) organizes the wireless network in a hierarchical topology having at least one root node and updates a list of interferers and a list of descendents. Then, the computational device allocates a Contention Free Period (CFP) slot to each computational device in the wireless network based on at least one of the list of interferers and the list of descendents and transmits data during the allocated CFP slot.

21 Claims, 18 Drawing Sheets

U.S. PATENT DOCUMENTS

| | | | |
|---|---|---|---|
| 2004/0170130 A1* | 9/2004 | Mehra | 370/256 |
| 2004/0253948 A1* | 12/2004 | Laberteaux | 455/422.1 |
| 2005/0002407 A1* | 1/2005 | Shaheen et al. | 370/401 |
| 2005/0135275 A1* | 6/2005 | Hester et al. | 370/256 |
| 2005/0135295 A1* | 6/2005 | Walton et al. | 370/328 |
| 2006/0171344 A1* | 8/2006 | Subramanian et al. | 370/315 |

* cited by examiner

METHOD AND SYSTEM FOR DATA TRANSMISSION IN A WIRELESS NETWORK

FIELD OF THE PRESENT INVENTION

This present invention relates in general to wireless networks, and more specifically, to transmission of data in wireless networks.

BACKGROUND OF THE PRESENT INVENTION

Various methods have been proposed for transmitting data in a wireless network so that the various devices transmitting data do not interfere with each other.

One method that has been proposed by IEEE 802.11 describes a method to determine the availability of a transmission medium and then transmitting data during a Contention Period (CP) to avoid interference. The method employs Carrier Sense Multiple Access with Collision Avoidance (CSMA/CA) for determining availability and transmitting data.

An extension to IEEE 802.11 is described in IEEE 802.11e which describes communication by using Contention Free Periods (CFPs) in a beacon interval. With IEEE 802.11e, each CFP is divided into CFP slots where each CFP slot is allocated to a single device for transmission of data. In such a fashion, the various devices do not interfere with each other.

However, where each CFP slot is allocated to a single device, as the number of devices in the wireless network increases and as the system conditions change in the wireless network, the efficiency of allocating a CFP slot to a single device leads to ineffective usage of the transmission medium.

Accordingly there exists a need for an improved method and system for data transmission in a wireless network.

BRIEF DESCRIPTION OF THE DRAWINGS

The present invention is illustrated by way of an example, and not limitation in the accompanying figures, in which like references indicate similar elements, and in which.

Figure 1:
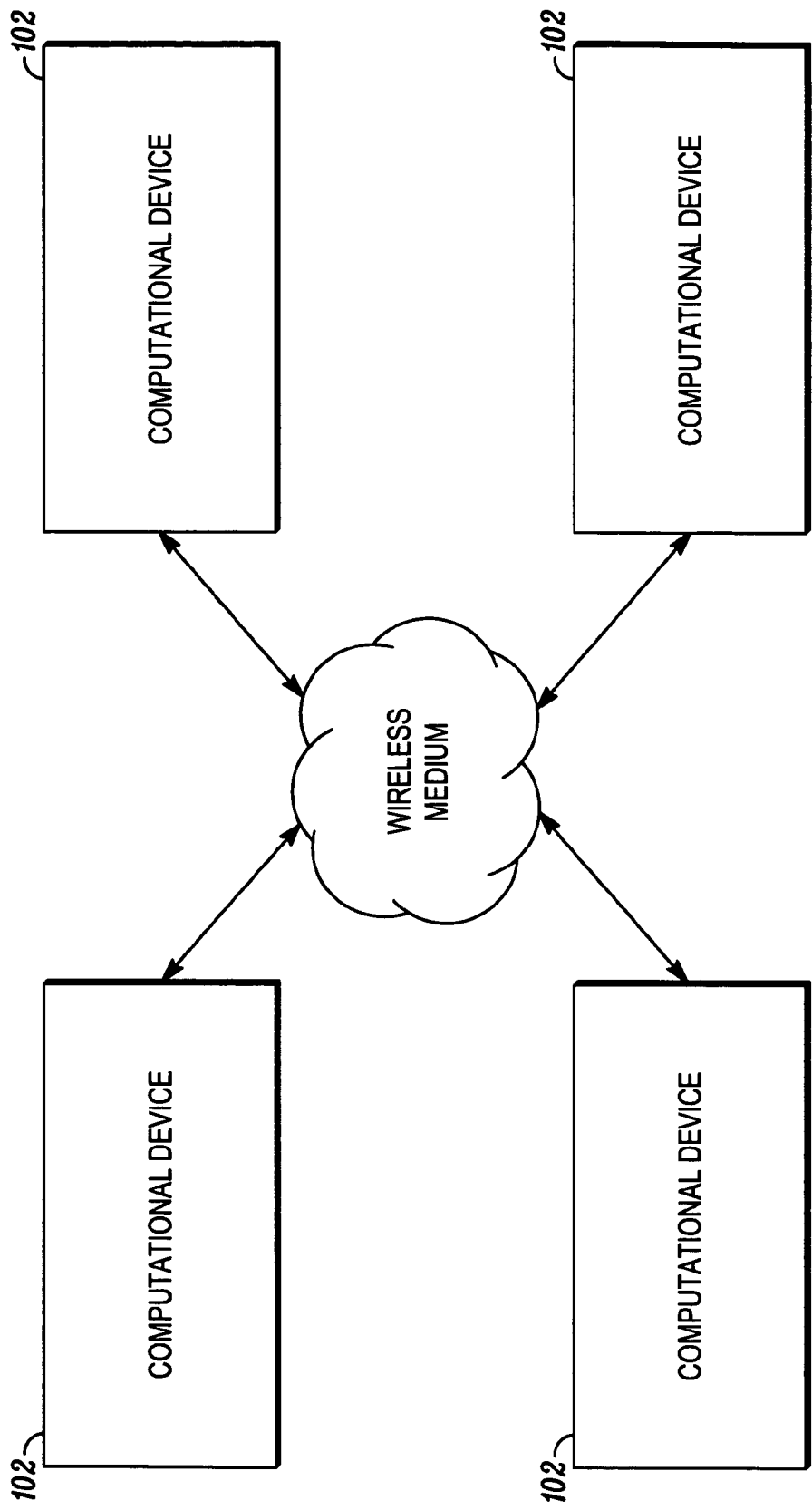
FIG. 1 depicts an exemplary environment in which various embodiments of the present invention may operate.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE VARIOUS EMBODIMENTS

The instant disclosure is provided to further explain in an enabling manner the best modes of making and using various embodiments, in accordance with the present invention. The disclosure is also given to enhance the perception and appreciation of the inventive principles and advantages thereof, rather than to limit in any manner the present invention. The present invention is defined solely by the appended claims, including any amendments made during the pendency of this application and all equivalents of the claims, as issued.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such processes, methods, articles, or apparatuses. An element preceded by "comprises . . . a" does not, without more constraints, preclude the existence of additional and identical elements in the process, method, article, or apparatus that comprises the element.

The term "another", as used herein, is defined as at least a second or additional. The terms "including" and/or "having", as used herein, are defined as comprising. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The present invention provides a method for transmitting data in a wireless network, the wireless network having a plurality of computational devices. The plurality of computational devices is organized in a hierarchical topology so that each computational device has zero or more direct descendents. Therefore, each computational device is a parent for each of the zero or more direct descendents. Each of the zero or more direct descendents may further have zero or more direct descendents. The hierarchical topology identifies one root node from the plurality of computational devices. The root node has all other computational devices as its descendents. Each of the plurality of computational devices updates a list of interferers. Computational devices, which are able to communicate with another computational device, and are not the parent or descendents of the computational device, are called interferers of the computational device. Each of the plurality of computational devices also maintains a list of its descendents.

The plurality of computational devices transmits data during a transmission time slot. A transmission time slot is a time slot between two beacon signals in the wireless network. The transmission time slot is divided into a Contention Period (CP) and a Contention Free Period (CFP). The CFP is further divided into a plurality of CFP slots. Each of the plurality of CFP slots is allocated to the plurality of computational devices for transmission of data. The CFP also includes dependent and independent CFP slots where independent means that two computational devices are independent if the descendents of the computational devices do not have any descendents that are interferers of each other. As used herein, the CFP is a period of time where a node can transmit onto a communication channel without needing to contend with other nodes at the time of transmission.

The present invention also describes a system suitable for data transmission in an ad-hoc wireless network, the ad-hoc wireless network having a plurality of computational devices. Each of the plurality of computational devices includes an organization module for organizing the plurality of computational devices in a hierarchical topology. Each of the plurality of computational devices further includes an interference detect module, which identifies and prepares a list of interferers for each of the plurality of computational devices. Further, each of the plurality of computational devices includes a CFP allocation module to allocate the CFP slots to each of the plurality of computational devices so that the computational device can transmit data during the allocated CFP slot.

FIG. 1 depicts an exemplary environment in which various embodiments of the present invention may operate. The environment depicts a wireless network 100. The wireless network 100 includes a plurality of computational devices and a wireless medium. The plurality of computational devices has (hereinafter referred to as computational devices 102), can communicate with each other through the wireless medium. Examples of the wireless network 100 include a Wireless Local Area Network (WLAN), an ad-hoc WLAN and an ad-hoc multi-hop WLAN. Examples of the computational devices 102 include personal computers, Global Positioning System (GPS) handheld devices, mobile communication devices and the like. In one embodiment, the computational devices 102 can communicate with each other by transmitting data in a particular frequency band of the wireless medium.

Figure 2:
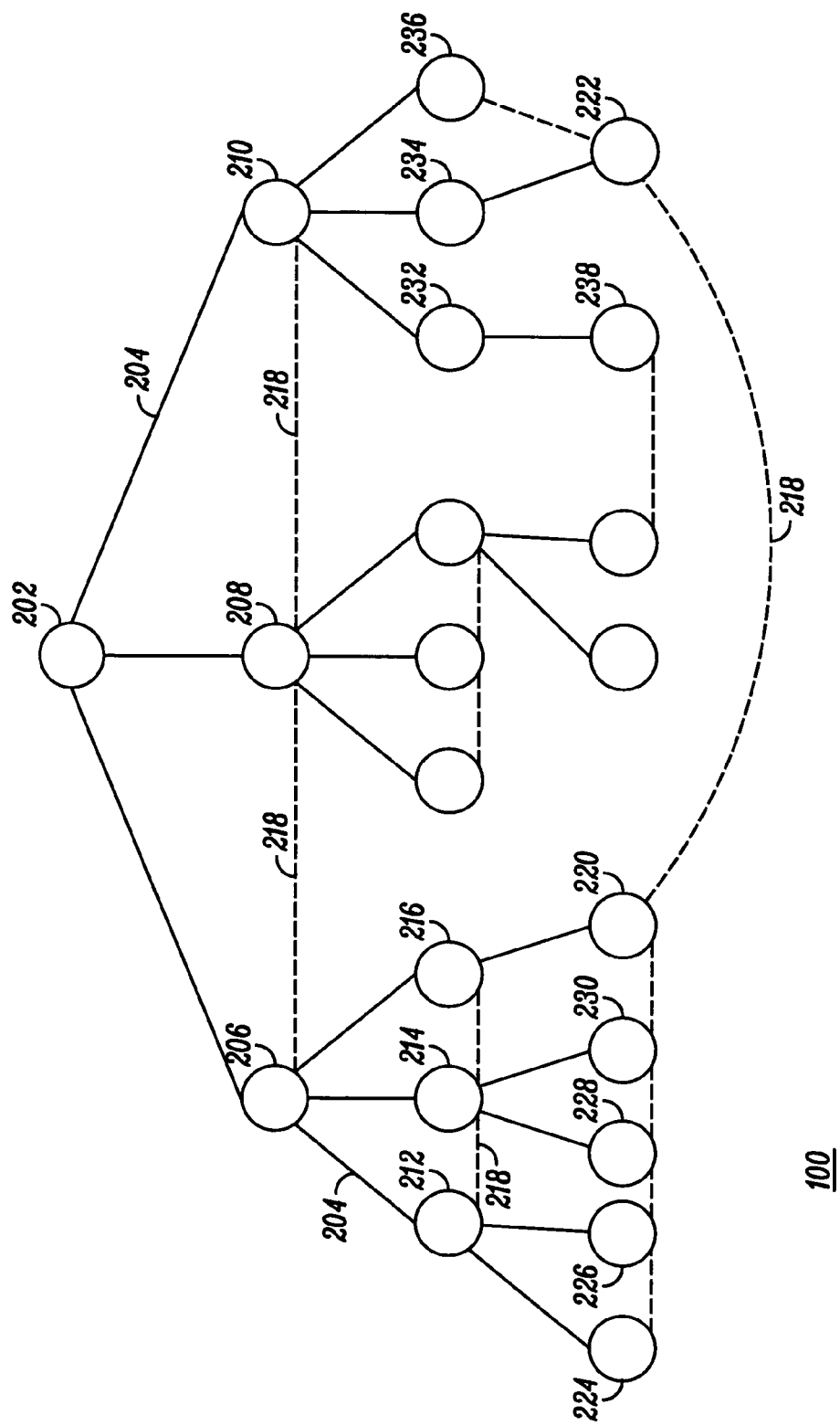
FIG. 2 is a block diagram illustrating a plurality of computational devices arranged in a hierarchical topology, in accordance with an exemplary embodiment of the present invention.

FIG. 2 is a block diagram illustrating a plurality of computational devices 102 arranged in a hierarchical topology, in accordance with an exemplary embodiment of the present invention. Hereinafter, the terms, a computational device and a node, have been used interchangeably. The hierarchical topology has a node 202 as the root node. The root node has all the remaining nodes as its descendents. In an embodiment of the present invention, a node with the lowest Media Access Controller (MAC) address may be selected as the root node. Solid lines, e.g. line 204, depict a direct descendent relation between two nodes. For example, the node 202 has nodes 206, 208 and 210 as its direct descendents. Similarly, the node 206 has nodes 212, 214 and 216 as its direct descendents. Dashed lines, e.g. line 218, depict an interference relation between two nodes. For example, a node 220 and a node 222 are interferers of each other. Thus, if the nodes 220 and 222 are transmitting data simultaneously, the data being transmitted by the nodes 220 and 222 may get corrupted.

A node can send data to and receive data from nodes, which are a) descendents, b) a parent, or c) interferers of the node. The descendents, the parent and interferers of the node together form a neighborhood of the node. For example, a neighborhood of the node 206 includes the node 202, which is a parent node of the node 206; the nodes 212, 214 and 216, which are direct descendents of the node 206, and the node 208, which is an interferer of the node 206.

Figure 3:
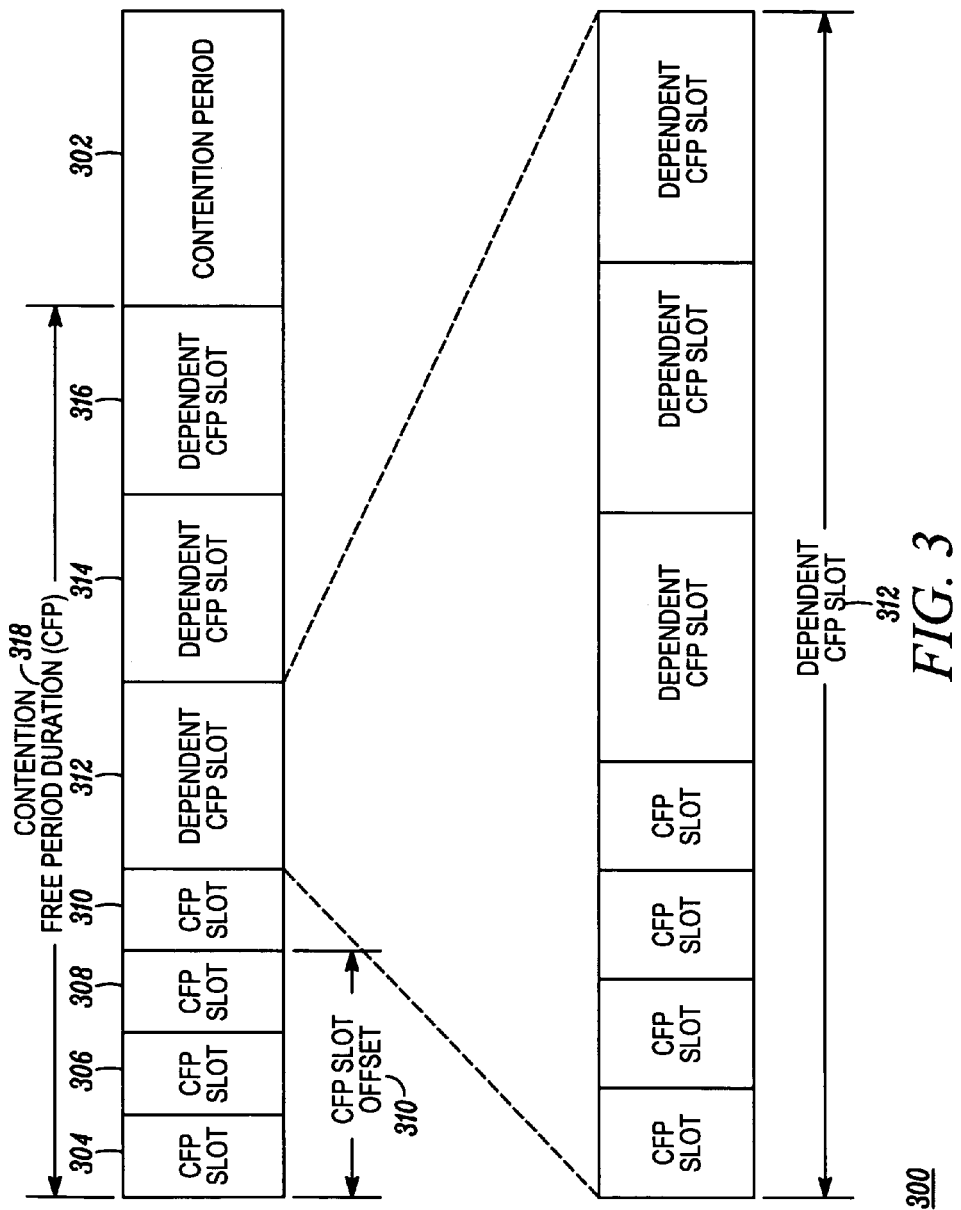
FIG. 3 is a block diagram depicting a transmission time slot.

FIG. 3 is a block diagram depicting a transmission time slot 300. The transmission time slot 300 is a time period between two consecutive beacon signals in the wireless network 100. The transmission time slot 300 includes two parts: a CP 302 and a CFP 318. During the CP 302, each node has equal access to a wireless medium for transmitting data. In one embodiment, accessing the wireless medium during the CP 302 is achieved through each node attempting to gain access and using the wireless medium after checking for collision detection, as is known in the art. In an embodiment of the present invention, checking for collision detection is achieved by employing techniques like Carrier Sense Multiple Access (CSMA) with Collision Avoidance (CSMA/CA) and CSMA with Collision Detection (CSMA/CD). Unlike during the CP 302, during the CFP 318, nodes have priority access to the wireless medium with only allocated nodes transmitting during the CFP 318. In any case, as mentioned above, the CFP 318 is a period of time where a node can transmit onto a communication channel without needing to contend with other nodes at the time of transmission.

The CFP 318 is divided into a plurality of CFP slots, for example, CFP slots 304, 306, 308 and 310, and a plurality of dependent CFP slots, for example, dependent CFP slots 312, 314 and 316. A CFP slot is a time for a node to communicate with its parent node and its direct descendents (also termed "backhaul"). For example, the CFP slot 306 can be used by the node 206 for sending data to the nodes 202, 212, 214 and 216. Similarly, the CFP slots 308 and 310 can be allocated to the nodes 208 and 210, respectively. A dependent CFP slot is a time for a node to communicate with its descendents. In an embodiment of the present invention, a dependent CFP slot allocated to each node in the wireless network 100, e.g. to each node in the hierarchical topology. As such, each dependent CFP slot may be used by the descendents of the node. For example, the dependent CFP slot 312 can be allocated to the node 206 to be used by the nodes 212, 214, 216, 220, 224, 226, 228, and 230 for transmitting data.

Figure 4:
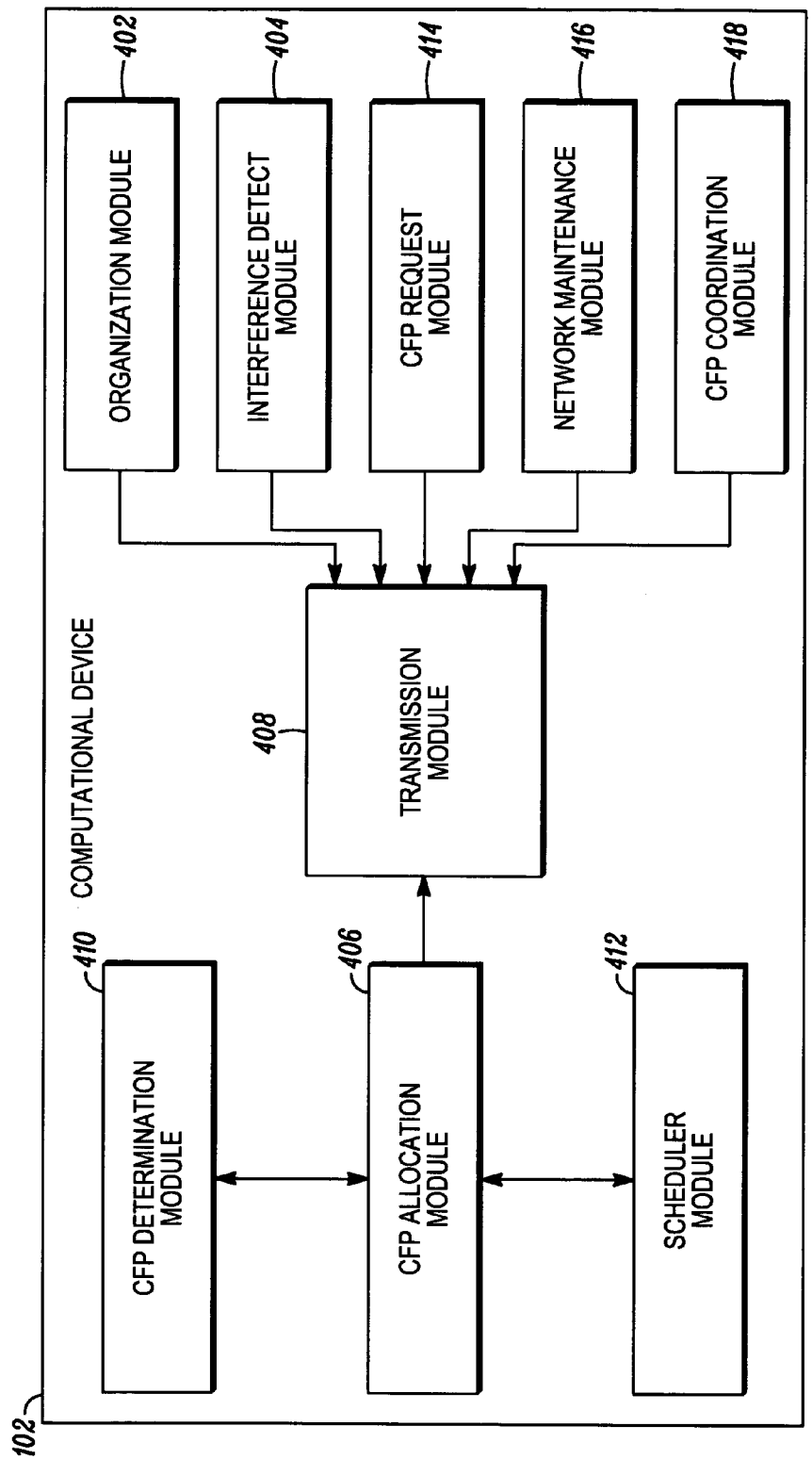
FIG. 4 is a block diagram illustrating the components of a computational device, in accordance with an embodiment of the present invention.

FIG. 4 is a block diagram illustrating the components of a computational device, e.g. computational device 102 or node 208, in accordance with an embodiment of the present invention. The computational device 102 includes an organization module 402, interference detect module 404, a CFP allocation module 406 and a transmission module 408. The organization module 402 interacts with the organization modules present in the nodes in the neighborhood of the computational device 102 and assigns a position to the computational device 102 in the hierarchical topology. The organization module 402 then prepares a list of descendents and parent of the computational device 102.

The interference detect module 404 is capable of scanning the neighborhood of the computational device 102 and detecting interferers for the node 102. In one embodiment, the interference detect module 404 periodically updates a list of interferers for the computational device 102.

The CFP allocation module 406 present in the computational device 102 is capable of allocating a CFP slot to the descendents of the computational device 102. In one embodiment, the allocation is done hierarchically based upon the list of interferers and a list of descendents for the computational device 102. Based upon the list of interferers and the list of descendents, the CFP allocation module 406 allocates separate CFP slots to nodes that are interferers for each other, thus avoiding any interference while transmitting data. In an embodiment of the present invention, the CFP allocation module 406 sends information about the CFP slot to a CFP determination module 410 for determination of a CFP slot duration for the CFP slot.

In one embodiment, a scheduler module 412 calculates an Aggregate Descendent Queue Size (ADQS) for the computational device 102. The ADQS is an aggregate of an independent CFP slot, dependent CFP slots and a sum of local queue sizes for the descendents of the computational device 102. When the ADQS exceeds the duration of the CFP slot, the scheduler module 412 prorates the CFP slot.

In an embodiment of the present invention, the CFP allocation module 406 sends a CFP slot allocation message to zero or more direct descendents of the computational device 102 using the transmission module 408 where the CFP slot allocation message includes information about the duration of the CFP slot (calculated by the scheduler module and described above) and a CFP slot offset for a CFP slot assigned to the zero or more direct descendents of the nodes. In one embodiment, the CFP slot offset is used to define the CFP slot where the CFP slot offset is the time that elapses in the transmission of data from the computational device 102 to transmission of data at the CFP slot.

In another embodiment of the present invention, on detecting a change in the list of interferers for the computational device 102, a CFP request module 414, present in the computational device 102, sends a CFP slot request to the parent of the computational device 102. The CFP slot request may also be sent when there is a change in the list of descendents of the computational device 102. In an embodiment of the present invention, the CFP slot request includes information about the neighborhood of the computational device 102, the list of interferers for the computational device 102, a local queue size for the computational device 102 and an ADQS for the descendents of the computational device 102. The CFP slot request is transmitted from the computational device 102 by the transmission module 408.

Continuing with reference to FIG. 4, the transmission module 408 transmits data and beacon signals from the computational device 102. In an embodiment of the present invention, beacon and polling signals from the organization module 402, the interference detect module 404 and a network maintenance module 416 are transmitted using the transmission module 408. In one embodiment, the network maintenance module 416 updates the list of descendents of the computational device 102 periodically.

A CFP coordination module 418 present in the computational device 102 is capable of transmitting beacon signals to achieve beacon synchronization and beacon-offset synchronization in the hierarchical topology. Further, the CFP coordination module 418 sends beacon signals to direct descendents where the beacon signal contains a duration of a CFP slot and a CFP slot offset for the direct descendent.

As known to one of ordinary skill in the art, achieving beacon synchronization and beacon-offset synchronization may be performed by each direct descendent further transmitting the beacon signal to one of its direct descendents after adding a current beacon-offset to the beacon-offset in the beacon signal where the current beacon offset depends on the time taken by the beacon signal to reach the direct descendent. Such a process is continued down the hierarchical topology until the beacon signal reaches a node with no direct descendents. At that point, the node at the bottom of the hierarchy responds by sending a beacon response which is successively resent up the hierarchy until the response is received at the highest layer. Thus, as described, in one embodiment, achieving beacon synchronization and beacon-offset synchronization is achieved by successive transmissions of a beacon signal where a current beacon-offset is added to the CFP slot offset.

In an embodiment of the present invention, a coordinated CFP poll can be used to achieve a coordination of starting times of CFP slots assigned to nodes. A parent of a node sends a CFP poll message to the node when the CFP slot is scheduled to start. The parent will first transmit data to the node for a duration assigned to the node, and then send the CFP poll message indicating the starting of the CFP slot. While transmitting a CFP poll acknowledgement to the parent, the node transmits data for a duration of a CFP slot of the CFP slot assigned to it.

Although the elements of FIG. 4 have been described with respect to computational device 102, the description is applicable for any other node in the wireless network 100.

Figure 5:
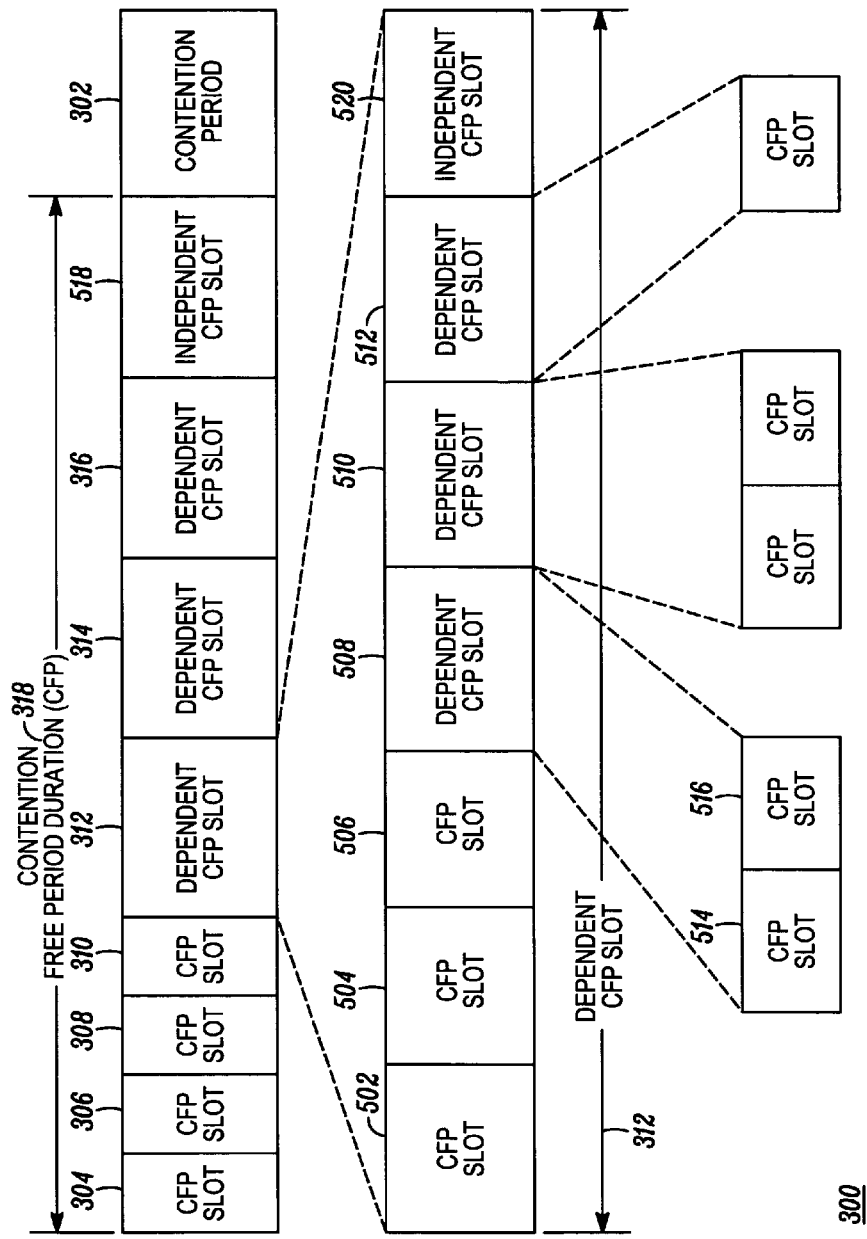
FIG. 5 depicts distribution of a CFP and a CP between the plurality of computational devices, in accordance with an exemplary embodiment of the present invention.

FIG. 5 depicts a distribution of the CFP 318 and the CP 302 between the plurality of computational devices, in accordance with an exemplary embodiment of the present invention. Each dependent CFP slot (e.g. 312) allocated to a node, is further divided into a plurality of CFP slots (e.g. 502, 504, 506), a plurality of dependent CFP slots (e.g. 508, 510, 512) and an independent CFP slot (e.g. 520). The plurality of CFP slots (e.g. 502, 504, 506) is allocated to the node's direct descendent for backhaul from the node's direct descendent. The plurality of dependent CFP slots (e.g. 508, 510, 512) is allocated to the direct descendents of the node's direct descendent. The independent CFP slot (e.g. 520) is allocated to the node's direct descendents. A dependent CFP slot (e.g. 508) for the direct descendent of a node's direct descendent is similarly further divided (e.g. into CFP slots 514, 516). In one embodiment, a dependent CFP slot has a CFP slot duration equal to zero if the node has no direct descendents.

In one embodiment, the duration of the CFP slot is determined based on a local queue and a list of interferers for the node where the local queue size includes inbound data to be transmitted from the node. For example, a dependent CFP slot 312 can be allocated to the node 206. In such a case, the dependent CFP slot 312 further includes a CFP slot 502 allocated to the node 212, a CFP slot 504 allocated to the node 214, a CFP slot 506 allocated to the node 216, a dependent CFP slot 508 allocated to the descendents of the node 212, a dependent CFP slot 510 allocated to the descendents of the node 214, a dependent CFP slot 512 allocated to the descendents of the node 216, and an independent CFP slot 520. The dependent CFP slot 508 similarly includes two CFP slots, namely a CFP slot 514 allocated to the node 224, and a CFP slot 516 allocated to the node 226.

Figure 6:
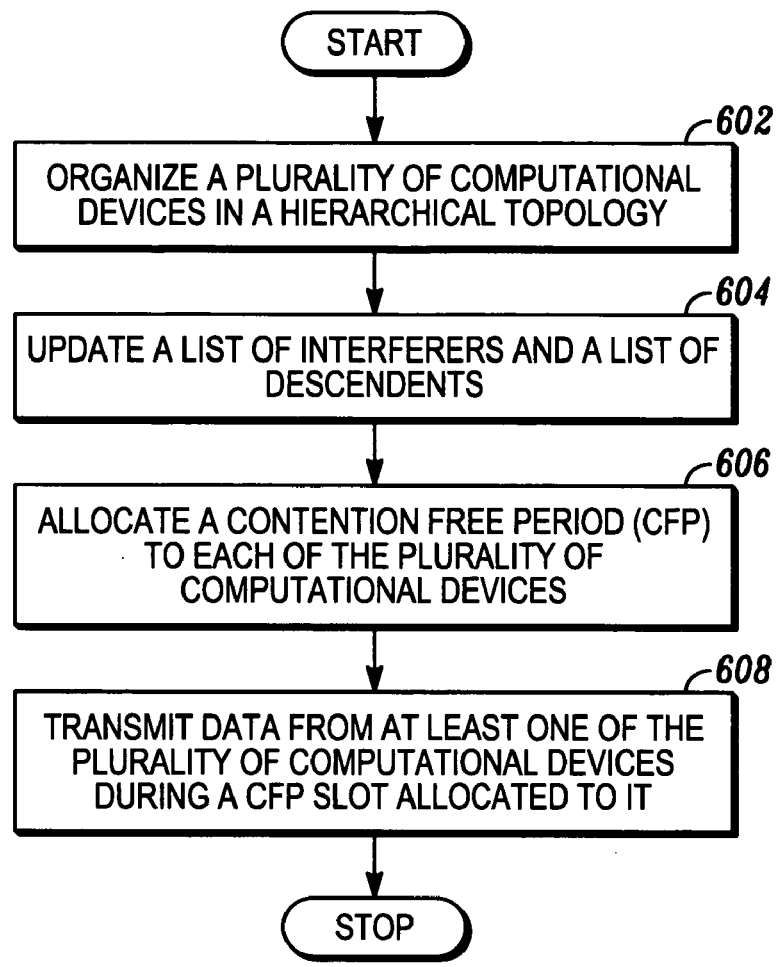
FIG. 6 is a flowchart illustrating a method for transmitting data in a wireless network, in accordance with an embodiment of the present invention.

As shown in FIG. 5, the CFP slot 318 includes an independent CFP slot 518 so that at least two independent nodes may simultaneously transmit data without corruption of data taking place. As mentioned previously, two nodes are independent if the descendents of the nodes do not have any descendents that are interferers of each other FIG. 6 is a flowchart illustrating a method for transmitting data in the wireless network 100, in accordance with an embodiment of the present invention. At step 602, the plurality of computational devices is organized in a hierarchical topology. In one embodiment, organizing computational devices in a hierarchical topology involves identifying a root node based on preset criteria. For example, the node 202 may be identified as the root node from among the plurality of computational devices, based on the MAC addresses of the plurality of computational devices. Nodes in a neighborhood, which are able to communicate with each other, are assigned positions near each other in the hierarchical topology. Tiers are organized by adding other nodes from the plurality of computational devices as descendents of the nodes in the neighborhood. As is known in the art, there are a number of other methods for organizing nodes in a hierarchy and will not be further described herein. At step 604, a list of interferers and a list of descendents are updated by each node. Creating a list of interferers and a list of descendents involves scanning a neighborhood of each node where nodes that are not either a parent or a direct descendent are considered to be interferers. Thus, any node in the neighborhood of a node can potentially be an interferer for the node performing the scanning, with the exception of a parent and direct descendents of the node.

Once the list of interferers and the list of descendents are determined, at step 606, a CFP slot is allocated to each node for transmission of data. In an embodiment of the present invention, the allocation is based on the neighborhood information for each node, a local queue size and an aggregate descendent queue size for each node. Step 606 is further described below in conjunction with FIGS. 13, 14, 15 and 16. Once the CFP slots are allocated, at step 608, data is transmitted from each node during the allocated CFP slot.

Figure 7:
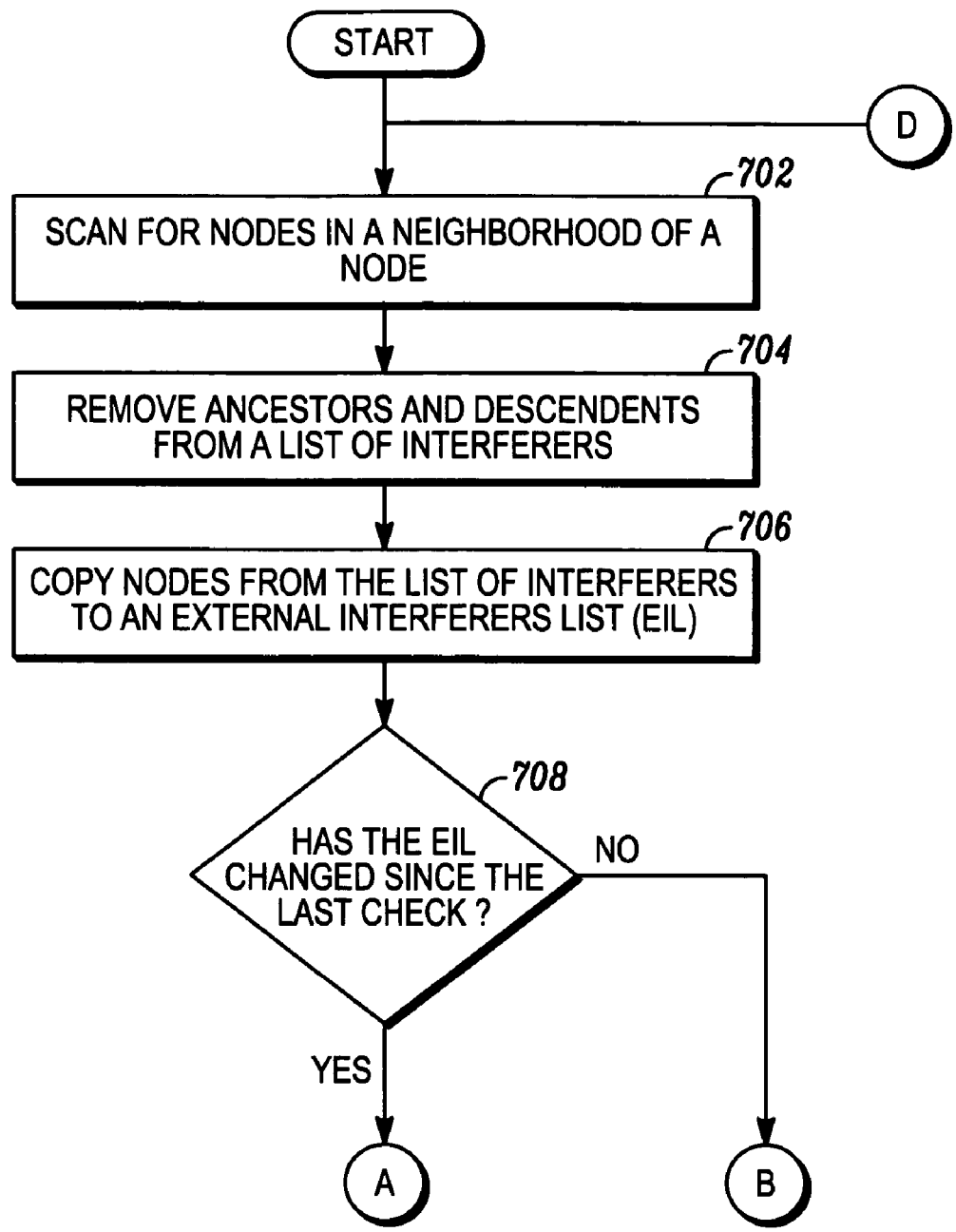
FIGS. 7, 8 and 9 illustrate flowcharts of a method for transmitting data in a wireless network, in accordance with another embodiment of the present invention.
Figure 8:
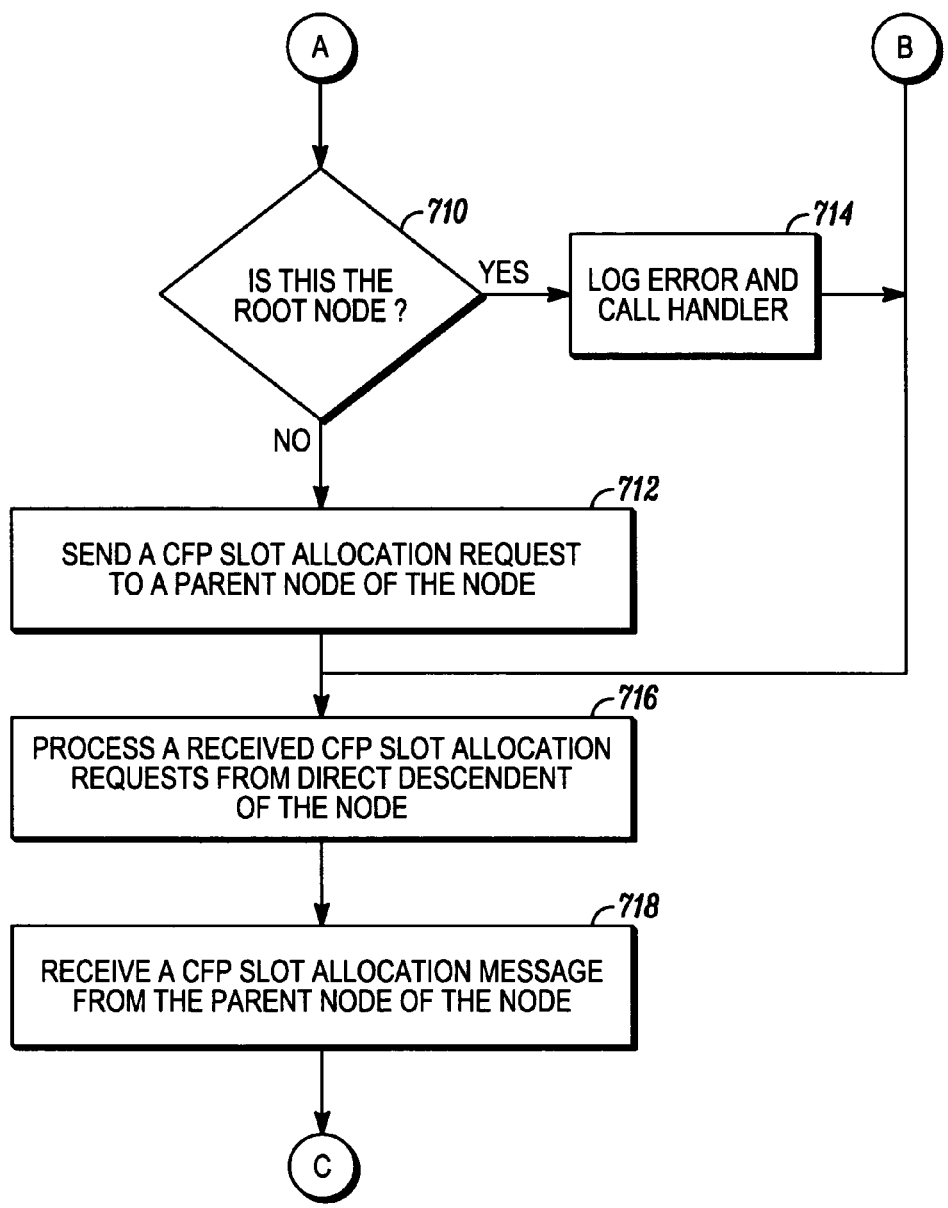
Figure 9:
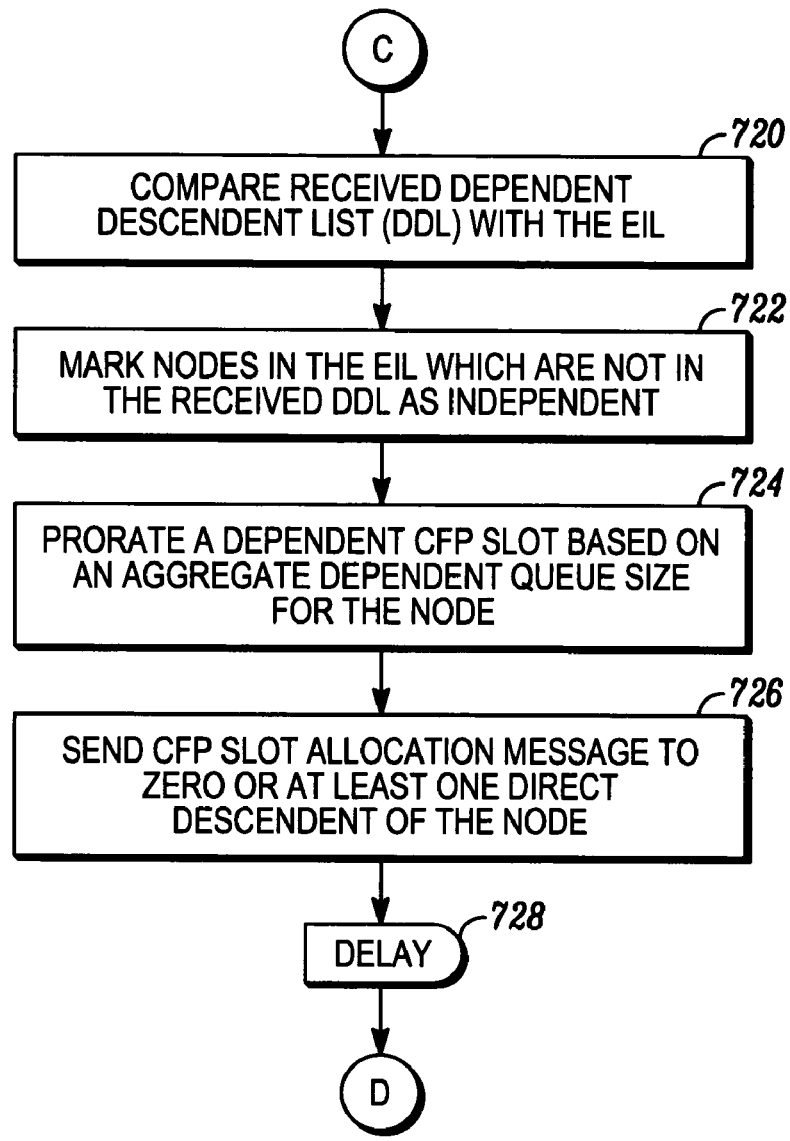

FIGS. 7, 8 and 9 illustrate flowcharts of a method for transmitting data in the wireless network 100, in accordance with another embodiment of the present invention. At step 702, a node scans its neighborhood and updates a list of descendents and a list of interferers. At step 704, the list of descendents is used to remove the descendents present in the list of interferers. Additionally, the list of interferers is checked and ancestors of the node are removed. At step 706, interferer nodes from the list of interferers are copied into an External Interferers List (EIL) where the EIL is a list of interferer nodes that can receive and send data to the node and are not the node's descendents. For example, an EIL for the node 220 includes the nodes 230 and 222. An interferer node in the EIL is associated with an originating node and a reporting node. A node originally detecting the interferer node is the originating node. A descendent of the node, which last reported the interferer node to the node, is the reporting node. For example, an EIL for the node 206 will include the node 222 as an external interferer with the node 220 as an originating node and the node 216 as the reporting node.

At step 708, the EIL is checked to determine if the EIL has changed since the last transmission of data from the node. The EIL changes if at least one interferer node is added to or removed from the list of interferers. In case the EIL has changed, step 710 is performed. At step 710, the node is checked to see if it is a root node. In case the node is not the root node, step 712 is performed. At step 712, a CFP slot allocation request is sent to a parent of the node. Sending a CFP slot allocation request (e.g. step 712) is further explained in detail in conjunction with FIG. 10. However, in case the node is the root node, step 714 is performed. At step 714, an error is logged and a call handler is called to resolve the error. The call handler is an exception-handling function. The error may occur because every other node in the hierarchical topology is a descendent for the root node, which implies that no node can be an interferer for the root node within the network. Thus, where the root node detects interference that cannot be identified or is originating in a similar but separate network, the root node could perform at least one of a number actions including reporting the error for network management functions, selecting a different frequency if the systems supports multiple dynamic frequency selections, and isolating a particular time period. These methods could be implemented for the entire wireless network or for selected nodes.

In any case, step 716 is performed. Step 716 is also performed in case no change is detected in the EIL at step 708. At step 716, the node processes the received CFP slot allocation requests from its direct descendents. The received CFP slot allocation requests include EILs for the direct descendents. Step 716 is explained in detail in conjunction with FIGS. 11 and 12.

Further, at step 718, a descendent node receives a received CFP slot allocation message from the node. In an embodiment of the present invention, the received CFP slot allocation message includes a CFP slot offset and a duration of a dependent CFP slot for a dependent CFP slot allocated to the descendent node; a CFP slot offset and a duration of a CFP slot for an independent CFP slot allocated to the node; and a Dependent Descendent List (DDL). The DDL is a list of descendents of the node which can use the dependent CFP slot.

At step 720, the DDL is compared with the EIL to determine independent nodes. Thus, at step 722, interferer nodes in the EIL, which are not in the DDL, are marked as independent nodes. The independent nodes will use the independent CFP slot allocated to the node. At step 724, the dependent CFP slot allocated to the node is prorated, based on the ADQS for the descendents of the node. Prorating the dependent CFP slot involves re-determining CFP slot durations and dependent CFP slot durations for the descendents of the node in case changes are made to the EIL. Finally, at step 726, a CFP allocation message is sent to zero or more direct descendents, depending on a number of descendents for which the dependent CFP slot durations have changed following the re-determination. In order to dynamically change to network conditions, the steps 702 to 726 are performed again after a delay of a pre-determined period at step 728 where the pre-determined period may be configurable based upon network conditions, anticipated network load, and the like.

Figure 10:
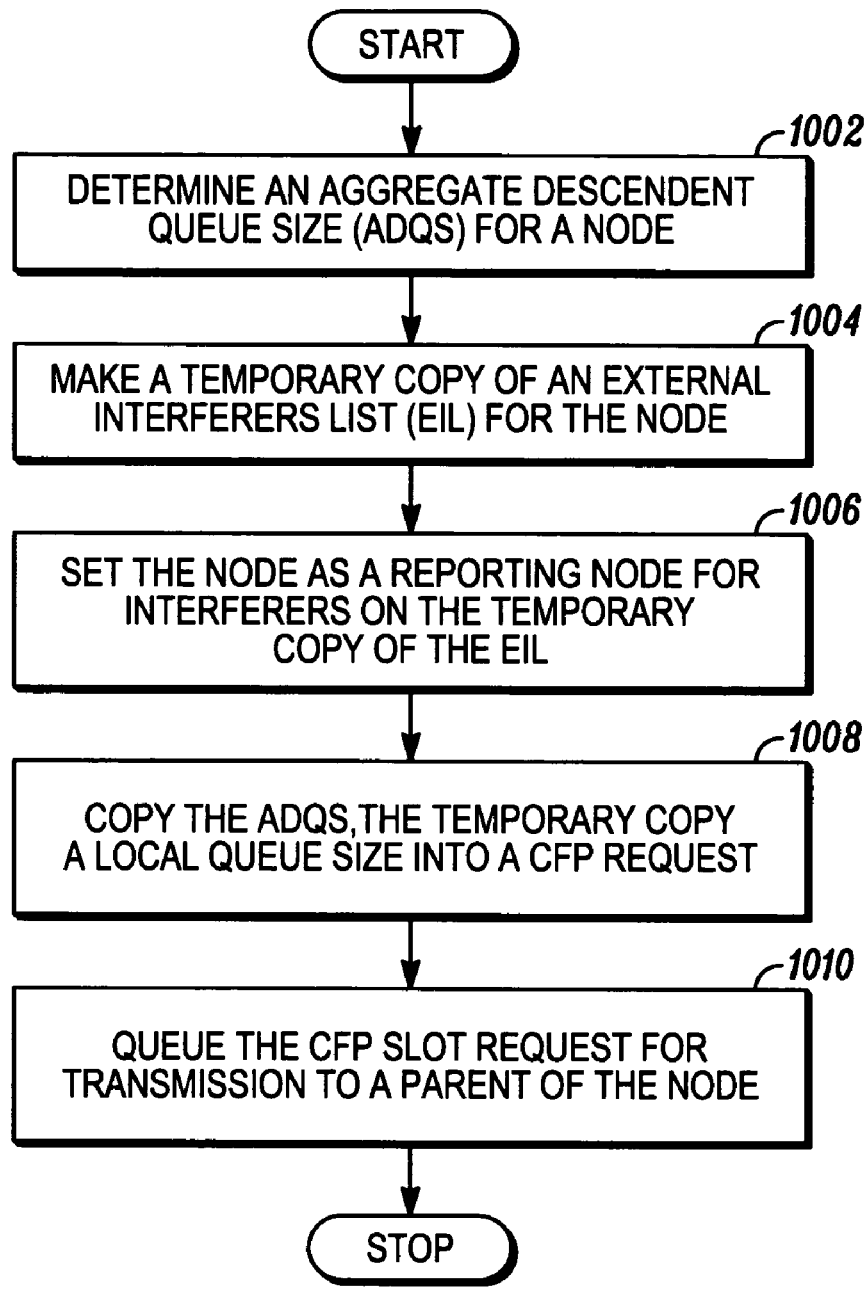
FIG. 10 is a flowchart illustrating a method for transmitting a CFP slot request for each of the plurality of computational devices, in accordance with an embodiment of the present invention.

FIG. 10 is a flowchart illustrating a method for transmitting a CFP slot request for each of the plurality of computational devices, in accordance with an embodiment of the present invention. At step 1002, an ADQS is determined for a node. The step 1002 is explained in detail in conjunction with FIGS. 13, 14, 15 and 16. At step 1004, a temporary copy of an EIL for the node is made. At step 1006, for each interferer in the EIL, the node is set as a reporting node. At step 1008, the ADQS, the temporary copy of the EIL and a local queue size for the node are copied into a CFP slot request. Finally, at step 1010, the CFP slot request is queued for transmission to the parent of the node.

Figure 11:
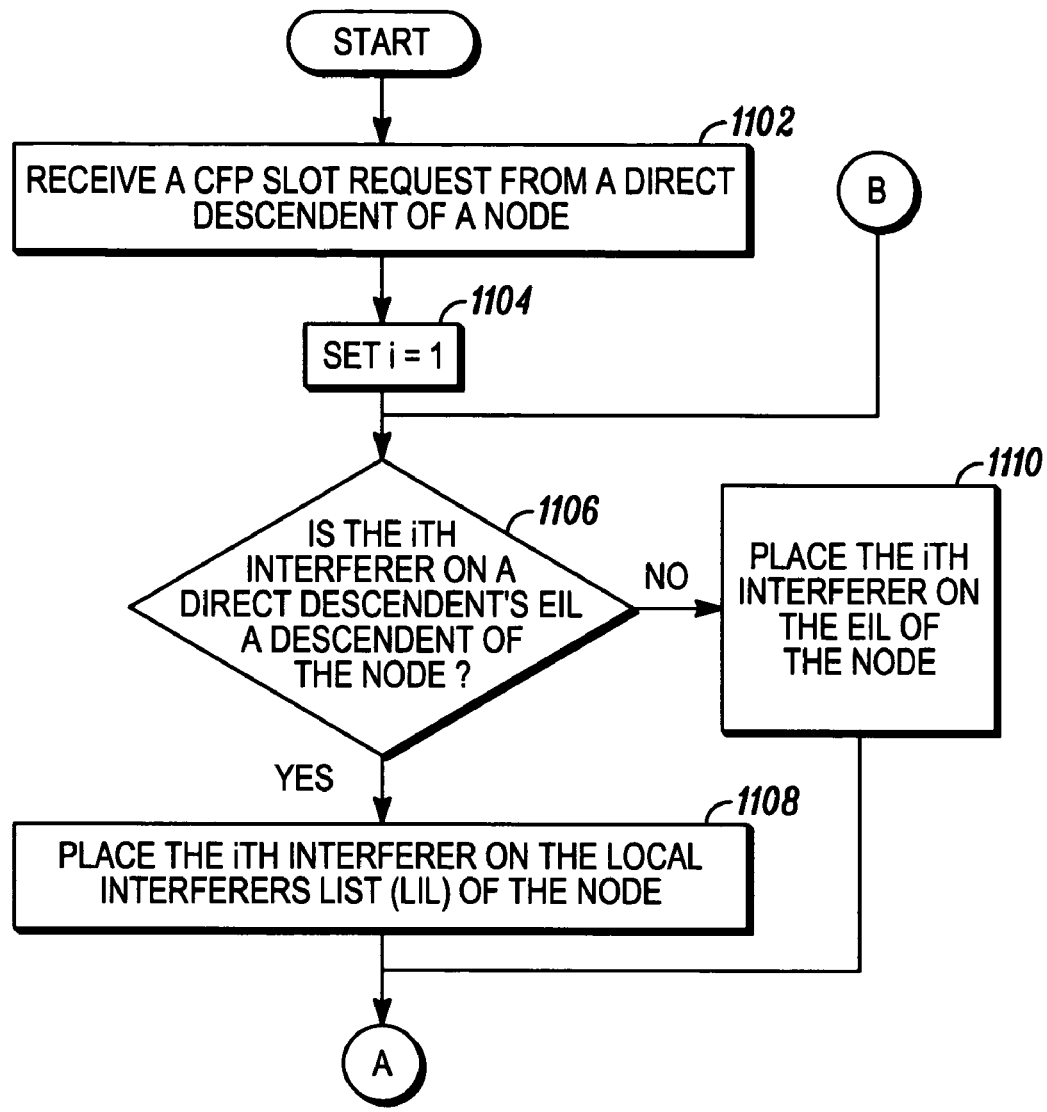
FIGS. 11 and 12 illustrate flowcharts of a method for processing a CFP slot request received from a direct descendent of each of the plurality of computational devices, in accordance with an embodiment of the present invention.
Figure 12:
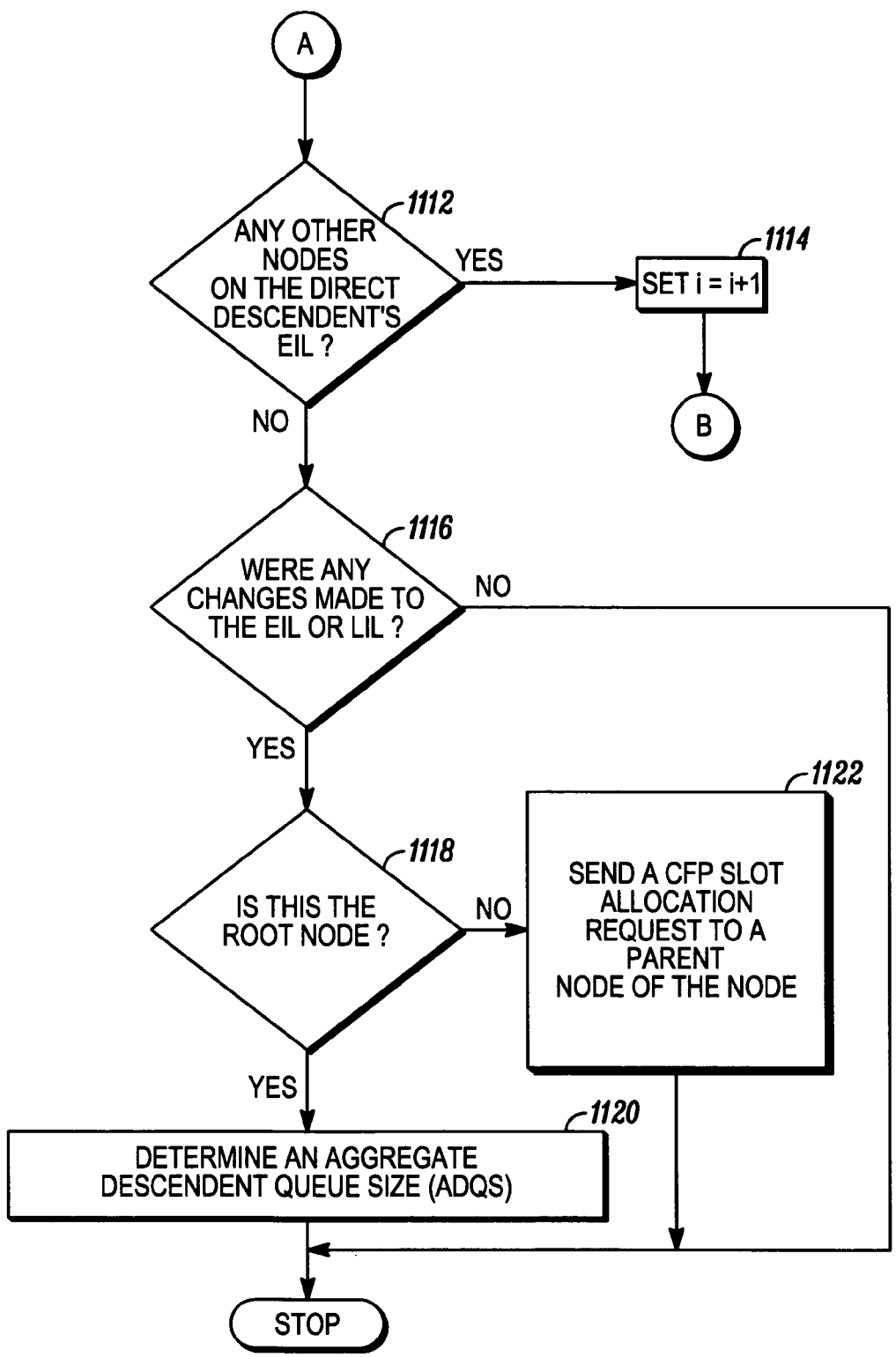
Figure 13:
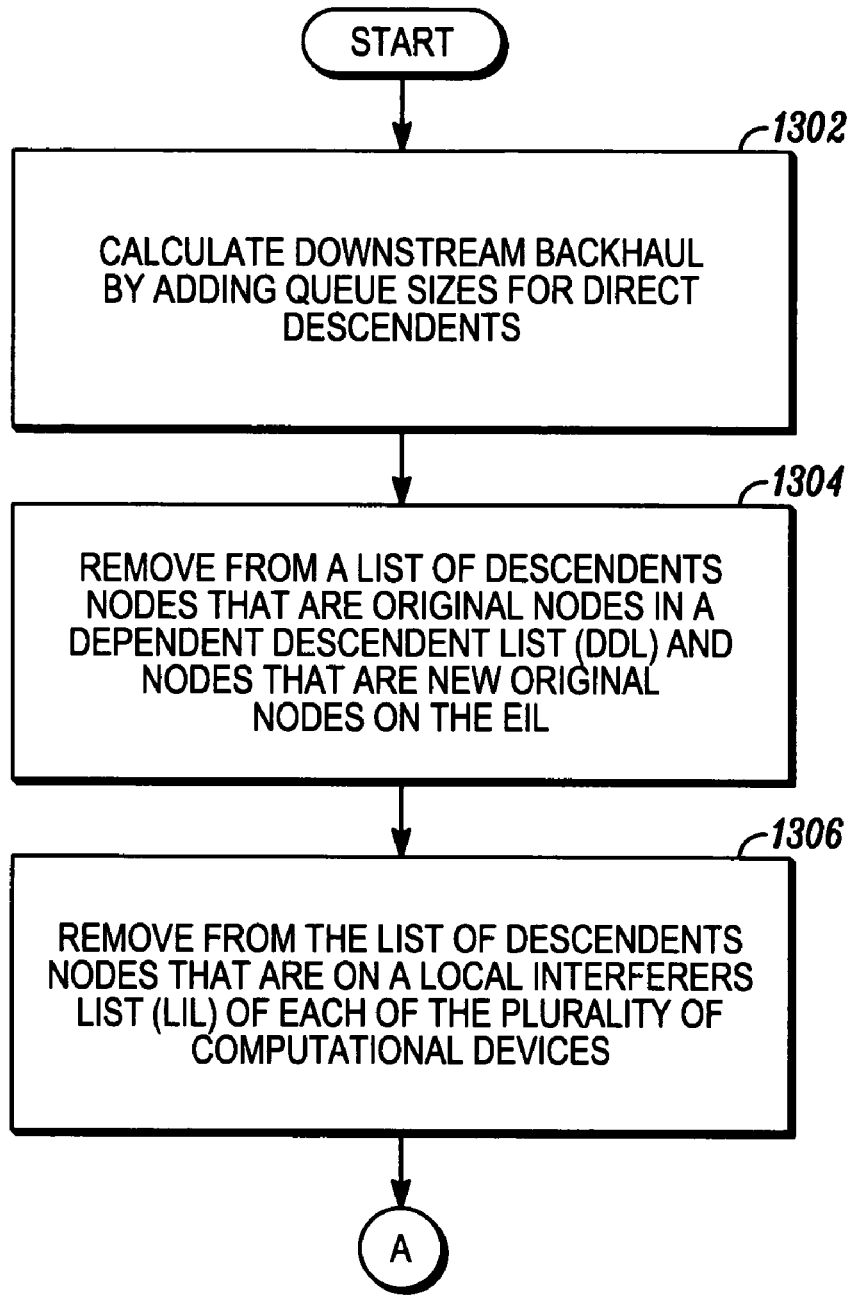
FIGS. 13, 14, 15 and 16 illustrate flowcharts of a method for determining a CFP slot duration for each of the plurality of computational devices.
Figure 14:
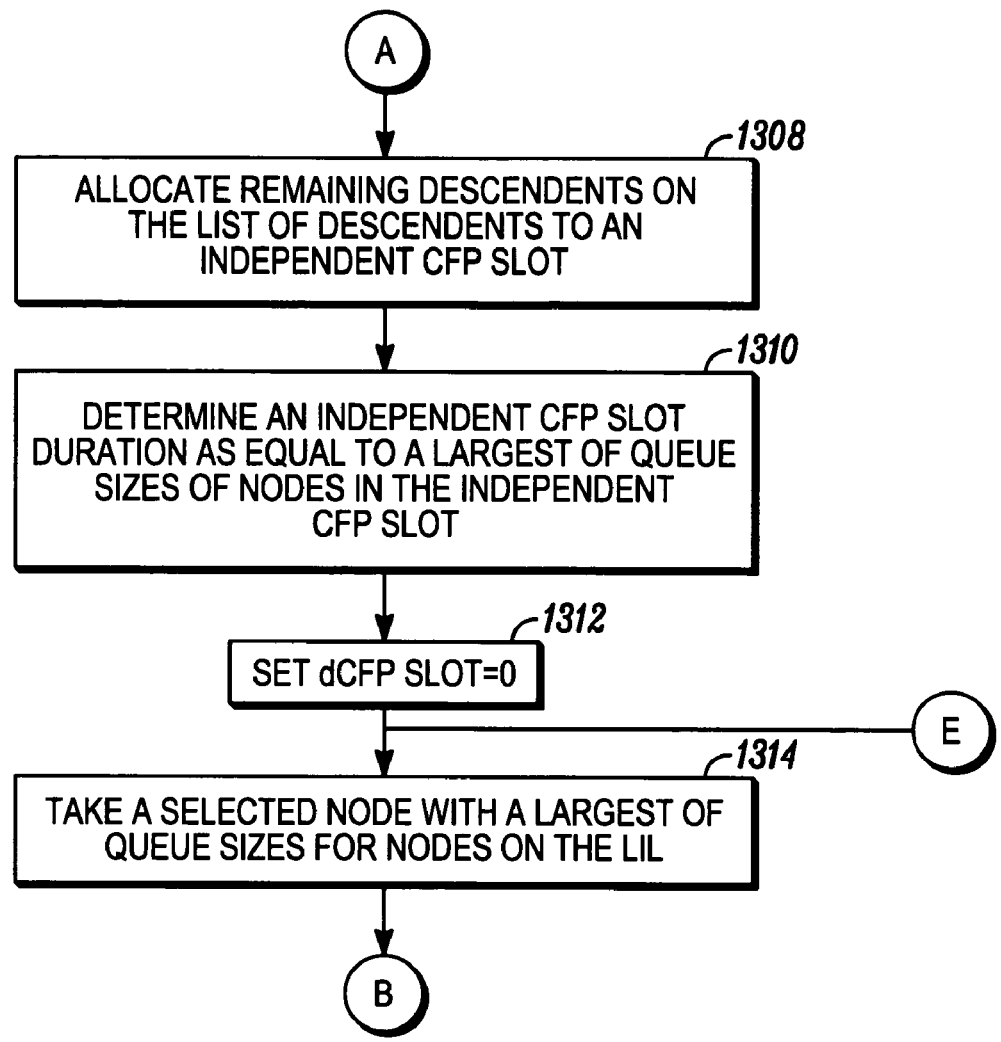
Figure 15:
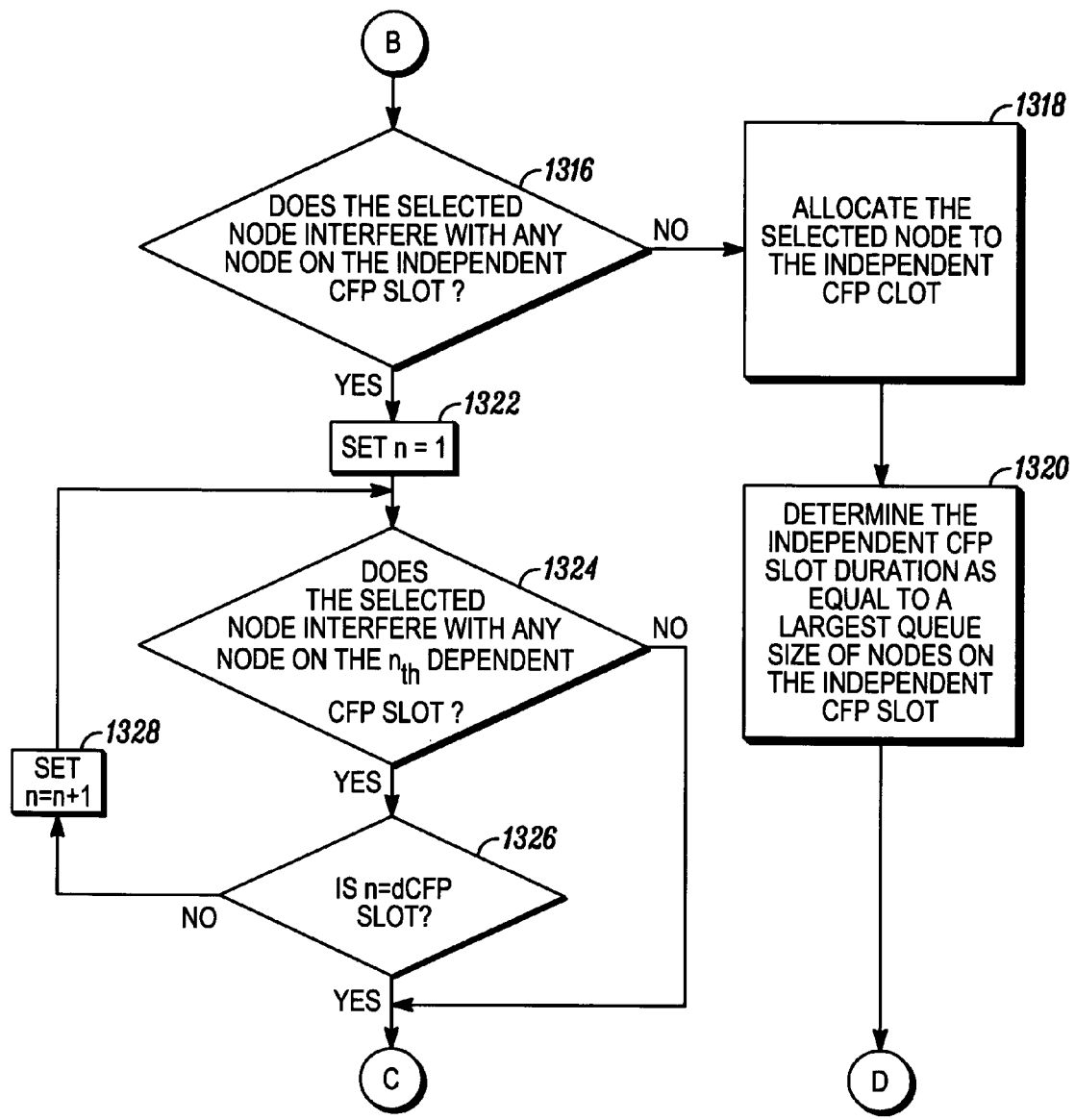
Figure 16:
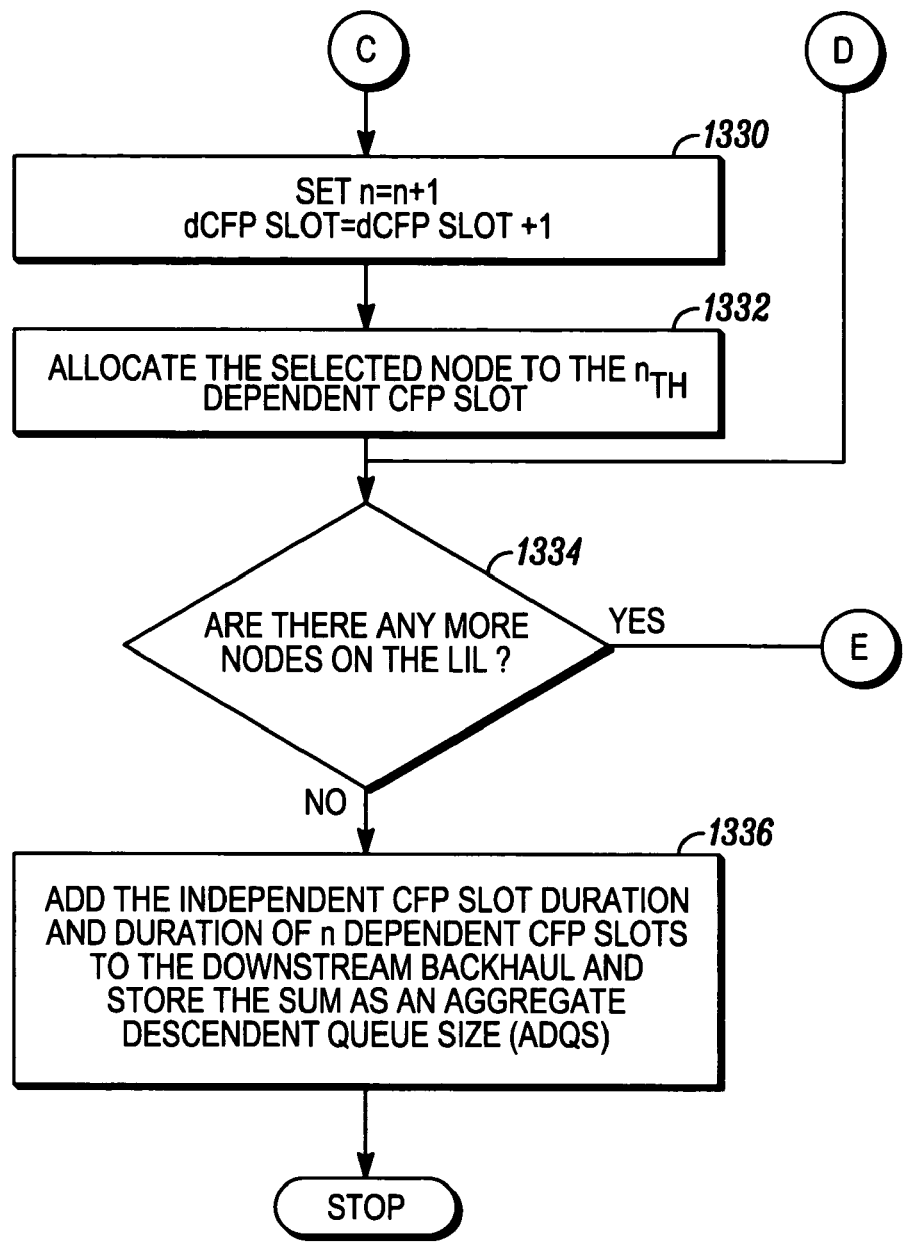

FIGS. 11 and 12 illustrate flowcharts of a method for processing a CFP slot request received from a direct descendent of each of the plurality of computational devices in accordance with an embodiment of the present invention. At step 1102, a node receives a CFP slot request from a direct descendent. The CFP slot request includes a direct descendant's EIL. At step 1104, a counter 'i' is set equal to 1. The counter 'i' is used to traverse the direct descendant's EIL and 'i' has a value equal to the number of nodes in the EIL. At step 1106, the $i_{th}$ interferer on the direct descendant's EIL is checked to see if it is a descendent of the node. In case the $i_{th}$ descendent is a descendent of the node, step 1108 is performed. At step 1108, the $i_{th}$ interferer is placed on a Local Interferers List (LIL) for the node where the LIL includes interferers that are descendents of the node and will be allocated a dependent CFP slot by the node. For example, an LIL for the node 206 will include the node 220 as a local interferer. Otherwise, at step 1110, the $i_{th}$ interferer is placed in an EIL of the node. For example, a LIL for the node 214 will include the node 220 as an external interferer.

In either case, at step 1112, the direct descendant's EIL is checked to see if there are any other interferers on it. If there is another interferer in the direct descendant's EIL, step 1114 is performed. At step 1114, the counter 'i' is incremented by one to iterate through the EIL. Then, step 1106 is performed again to check whether the $i_{th}$ interferer on the direct descendant's EIL is a descendent of the node. However, in case there are no other interferers in the direct descendant's EIL, at step 1116, the EIL and the LIL for the node are checked to see if any changes were made since a last transmission of data from the node. In case no changes were made to either the EIL or the LIL, the processing of the CFP slot request is stopped and no change is made to the current allocation. Otherwise, at step 1118, the node is checked to see if it is the root node. In case the node is the root node, at step 1120, an ADQS is determined for the node. Otherwise, at step 1122, a CFP slot allocation request is sent to a parent of the node so that the parent can perform processing of the CFP slot allocation request received from the node.

FIGS. 13, 14, 15 and 16 illustrate flowcharts of a method for determining a CFP slot duration for each of the plurality of computational devices. A CFP slot duration is determined every time a new interferer is detected for a descendent of a node or when an ancestor of the node allocates an independent CFP slot to a descendent of the node. Determining a CFP slot duration necessitates a re-determination of the ADQS. At step 1302, a downstream backhaul is calculated by adding together local queue sizes for direct descendents of a node. At step 1304, create a list of descendents where original nodes on a DDL for the node are removed from the list of descendents. In one embodiment, an ancestor of the node has designated the original nodes on the DDL and has allocated each original node a dependent CFP slot. Additionally, original nodes in an EIL of the node are also removed from the list of descendents. In one embodiment, the original nodes in the EIL are newly detected external interferers for the node and will be allocated a CFP slot by an ancestor of the node. Further, at step 1306, nodes on a LIL of the node are removed from the list of descendents. The nodes on the LIL are allocated dependent CFP slots by the node. For example, the node 220 is removed from a list of descendents for the node 206 as it will be allocated a dependent CFP slot.

At step 1308, nodes on the list of descendents are allocated to an independent CFP slot for the node. These are nodes that remain on the list of descendents of the node after steps 1304 and 1306 are performed. At step 1310, an independent CFP slot duration for the independent CFP slot is determined as equal to the largest of queue sizes for nodes in the independent CFP slot.

At step 1312, a counter dCFPslot is set as equal to 0 where the counter dCFPslot indicates a number of dependent CFP slots for the node. At step 1314, the LIL is traversed, and a node with a largest queue size of the nodes on the LIL is selected. At step 1316, a check is conducted to see if the selected node interferes with any node on the independent CFP slot. In case the selected node does not interfere with any node in the independent CFP slot, at step 1318, the selected node is allocated to the independent CFP slot. At step 1320, the independent CFP slot duration is determined as equal to the largest of queue sizes for nodes in the independent CFP slot. After the step 1320, step 1334 is performed and the LIL is traversed again to check if there are any other nodes that need to be allocated to an independent CFP slot.

However, if the selected node interferes with at least one node on the independent CFP slot, at step 1322, a counter 'n' is set as equal to 1 where n iterates until a number of dependent CFP slots for the node. Further, at step 1324, a check is performed to see if the selected node interferes with any node in an $n_{th}$ dependent slot. In case the selected node interferes with at least one node in the $n^{th}$ dependent CFP slot, at step 1326, the counter 'n' is checked to determine if its value is equal to the counter dCFPslot. In case the counter 'n' is not equal to the counter dCFPslot, at step 1328, the counter 'n' is incremented by one. Then step 1324 is repeated. However, in case the counter 'n' is equal to the counter dCFPslot, at step 1330 both the counter 'n' and the counter dCFPslot are incremented by one, thereby, adding, a new dependent CFP slot. Further, at step 1332, the selected node is allocated to the $n^{th}$ dependent CFP slot.

At step 1334, the LIL is traversed again to check if there are any other nodes on it. If there is at least one other node on the LIL, the process is repeated, starting from step 1314. However, if there is no other node on the LIL, step 1336 is performed. At step 1336, the independent CFP slot duration and a total duration of 'n' dependent CFP slots are added together to the downstream backhaul and stored as an ADQS for the node.

Figure 17:
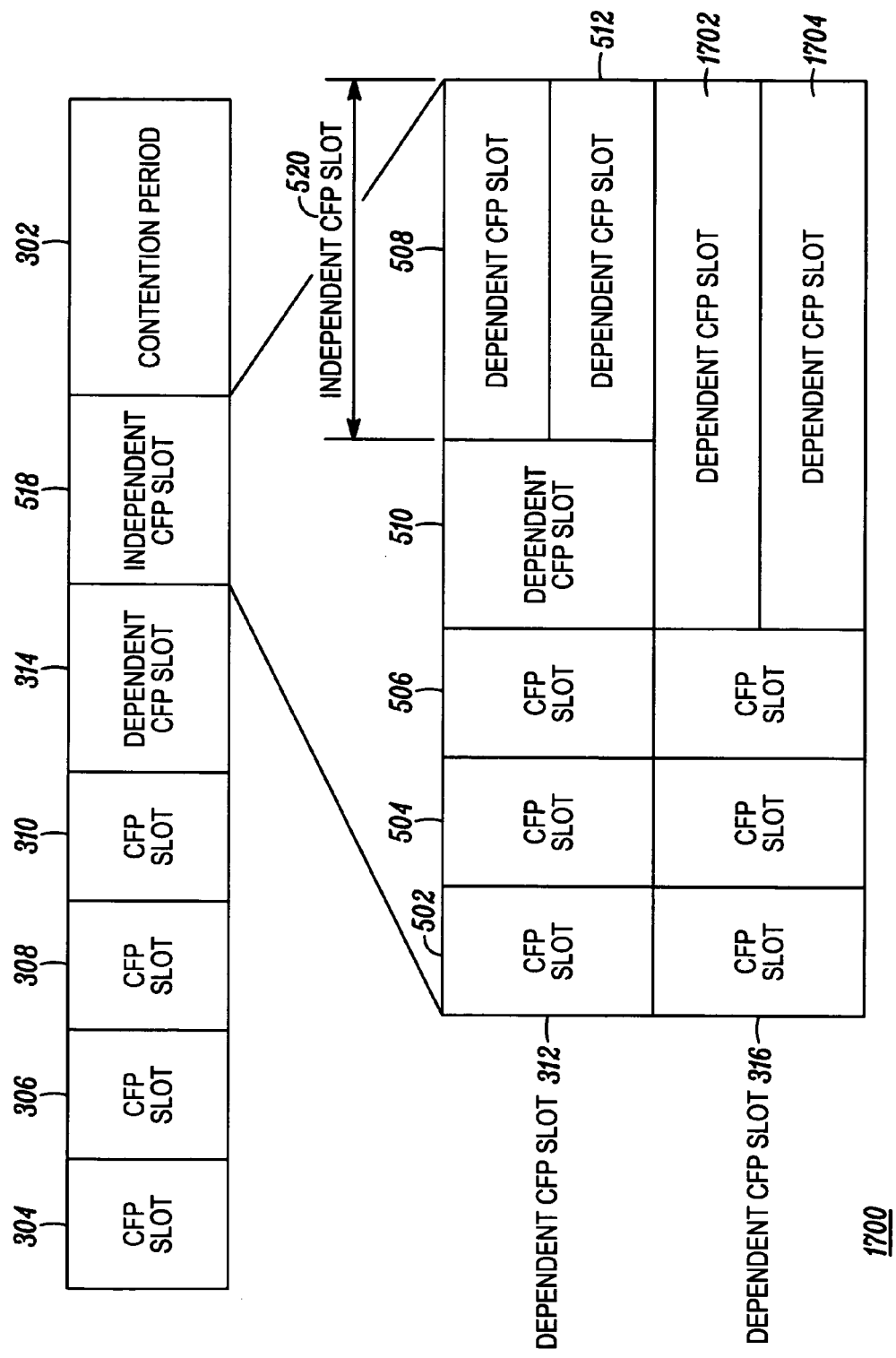
FIG. 17 is a block diagram depicting a modified transmission time slot, in accordance with an exemplary embodiment of the present invention.

FIG. 17 is a block diagram depicting a modified transmission time slot 1700, in accordance with an exemplary embodiment of the present invention. As described previously, CFP slots 502, 504, 506 are times for the nodes to perform backhaul services and the dependent CFP slots are times for the node to service descendents. Understanding that nodes 206, 210 do not interfere and thus can transmit at the same time leads to efficiencies in data transmission. As such, dependent CFP slots may be assigned to the nodes where the dependent CFP slots transmit at the same time. For example, node 206 may be assigned to dependent CFP slot 312 and node 210 may be assigned to dependent CFP slot 316. Further, since node 208 interferes with both nodes 206, 210, node 208 must be assigned a dependent CFP slot that does not allow for node 208 to transmit at a time that nodes 206, 210 are transmitting. As such, node 208 is assigned dependent CFP slot 314. In an embodiment of the present invention, an independent CFP slot duration for the independent CFP slot 518 is determined as equal to the larger of dependent CFP slot duration 312 and dependent CFP slot 316 by the detailed method for determining CFP slot duration explained in FIGS. 13, 14, 15 and 16.

The dependent CFP slot 312 includes dependent CFP slot 508, dependent CFP slot 510 and dependent CFP slot 512. In an embodiment of the present invention, the dependent CFP slot 312 is modified further and an independent CFP slot 520 (further comprising dependent CFP slots 508, 512) is allocated to the nodes 212 and 216 for simultaneous transmission of data. (as mentioned above). In a further modification, dependent CFP slot 312 can be optimized based upon the relationship between nodes 212, 214, 216. Note since there is interference between the nodes 212 and 214, the nodes 212 and 214 can not be allowed to transmit data simultaneously. Further, since there is interference between the nodes 214 and 216, the nodes 214 and 216 can not be allowed to transmit data simultaneously; however, the nodes 212 and 216 can transmit data simultaneously and are independent. Hence, the nodes 212 and 216 can be allocated to an independent CFP slot 520 (which is a part of the independent CFP slot 518) and allowed to transmit data simultaneously. For example, nodes 214 and 216 may utilize dependent CFP slots 508, 512. Because node 214 interferes with both nodes 212, 216, node 214 is assigned to a dependent CFP slot that does not transmit at the same time as nodes 212, 214. As such, node 214 is assigned to dependent CFP slot 510 (which is a part of the independent CFP slot 518).

Similarly, a dependent CFP slot 316 is also modified, as there is no interference between direct descendents, nodes 232, 234 and 236. As such, since nodes 238, 222 do not interfere with each other, nodes 238, 222 may transmit at the same time. As such, dependent CFP slots 1702, 1704 are allocated to nodes 238, 222. In such a fashion, efficiencies in data transmission are achieved.

However, there is an interference relation between the nodes 220 and 222. The node 222 is an external interferer for the nodes 216 and 206. Hence, the node 222 is an external interferer in an EIL of the node 206. As such, node 206 reports to its parent, namely the root node 202, that node 206 has an external interferer, namely node 222. Since node 222 is a descendent of node 202, the node 202 updates its LIL that node 222 is an external interferer. In an embodiment of the present invention, the dependent CFP slot 512 is allocated to the node 220 and dependent CFP Slot 1704 is assigned to node 222.

Figure 18:
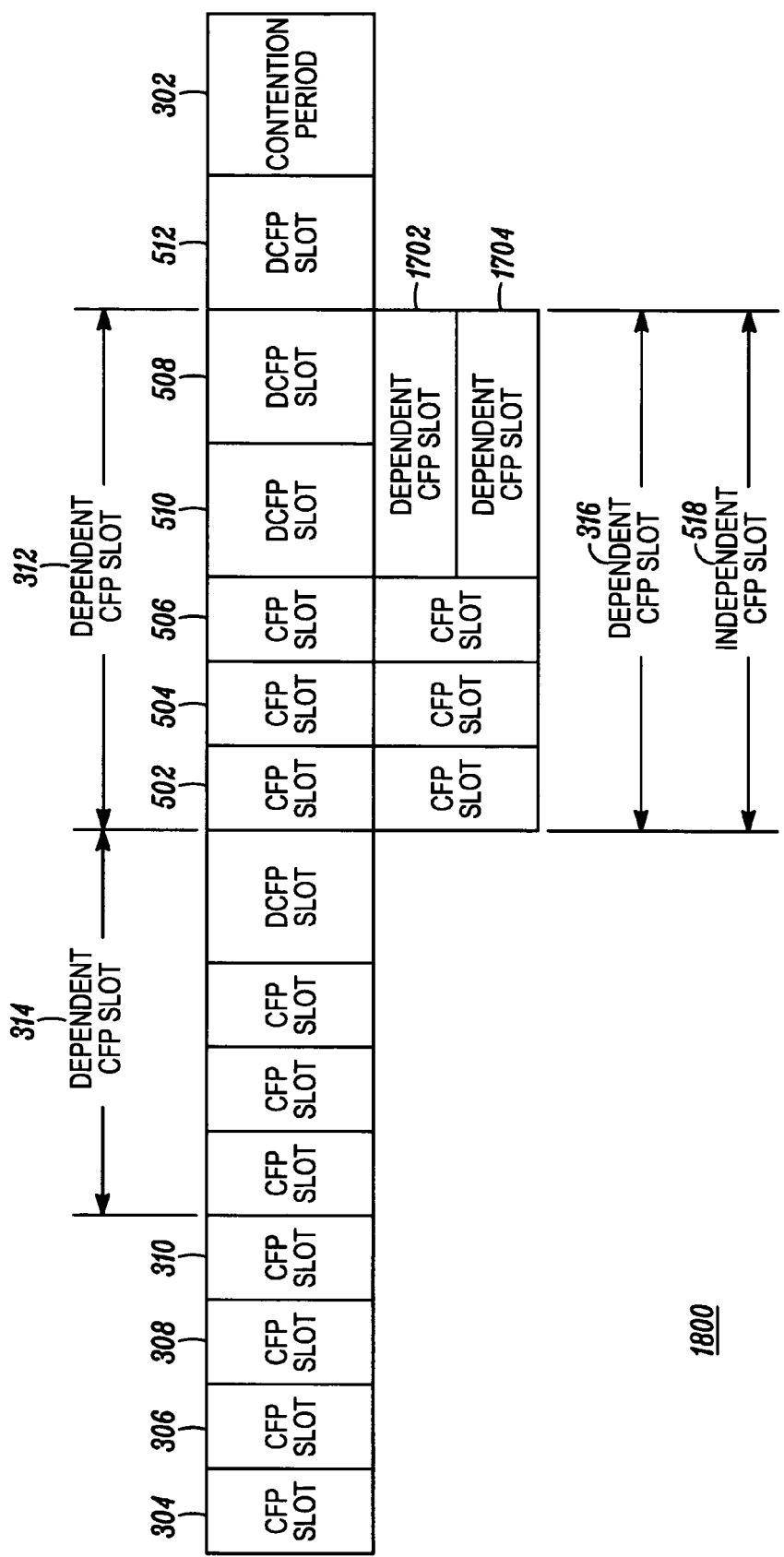
FIG. 18 depicts a modified distribution of the CFP and the CP between the plurality of computational devices, in accordance with an exemplary embodiment of the present invention.

FIG. 18 depicts a further modified distribution of the CFP and the CP between the plurality of computational devices, in accordance with an exemplary embodiment of the present invention to account for the interference between nodes 220 and 222. As such, the dependent CFP slot (also termed DCFP in FIG. 18) 512 is moved from the dependent CFP slot 312 (as shown in FIG. 17) so that node 220's transmission does not interfere with node 222's transmission. Referring to FIG. 11, since node 220 is the $i_{th}$ interferer on the LIL of the root node, node 220's transmission time is taken out of the dependent CFP slot 312 and placed at a time that does not interfere with node 222's transmission time. As such, node 220 is assigned to DCFP slot 512 which occurs after the independent CFP slot 518. Since there are no further modifications to be made, dependent CFP slot 316 remains the same.

In another embodiment of the present invention, each parent in the hierarchical topology will inform a descendent when a CFP slot allocated to each of the descendents starts. In such an embodiment, informing a descendent of a CFP slot allocation is done by means of transmitting a beacon signal from the parent to the descendent.

In yet another embodiment of the present invention, an Internet Gateway Protocol (IGP), for example an Open Shortest Path First (OSPF) can be used to organize the hierarchical topology. IGP can be used to organize the wireless network in a tree topology where the wireless network can be broken up into smaller networks, formed around a backbone area of the wireless network.

In still another embodiment of the present invention, partially independent descendents can be assigned overlapping dependent CFP slots where partially independent nodes are two nodes with few common interferers among their descendents. In such a case, the overlapping dependent CFP slots are not allocated to the few common interferers so as to prevent interference while transmitting data from the partially independent nodes.

Various embodiments of the present invention have the following advantages. First, the present invention allows effective use of the CFP between transmitting beacon signals. Second, allocation of CFP slots is done hierarchically based on requirements of a local queue of each individual node while considering its neighborhood and interferers situation. Thirdly, the allocation of CFP slots is done dynamically based on periodic updating of neighborhood information for each node in the hierarchical topology. Performing allocation of CFP slots dynamically allows scalability in the network based on the addition and removal of nodes in the wireless network and varying queue sizes for each node. The present invention also allows a spatial reuse of the available transmission medium by allocating independent CFP slots for simultaneous transmission of data by independent nodes.

This disclosure is intended to elaborate on how to fashion and use various embodiments, in accordance with the present invention, rather than limit the true, intended, fair scope and spirit thereof. The foregoing description is not intended to be exhaustive or limit the present invention to the precise forms disclosed. Modifications or variations are possible, in the light of the above teachings. The embodiment was chosen and described, to provide the best illustration of the principles of the present invention and its practical application to enable one with ordinary skill in the art, to utilize the present invention in various embodiments and with various modifications, as are suited to the particular use contemplated. All such modifications and variations are within the scope of the present invention, as determined by the appended claims, which may be amended during the pendency of this application for patent, and all equivalents thereof, when interpreted in accordance with the breadth to which they are fairly, legally and equitably entitled. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A method for transmitting data in a wireless network, the wireless network comprising a plurality of computational devices, the method comprising:

organizing the plurality of computational devices in a hierarchical topology, the hierarchical topology having at least one root node;

updating, for each particular computational device in the plurality, (i) a list of interferers comprising other computational devices that are within a wireless communication range of the particular computational device but are not a parent computational device or a descendant computational device of the particular computational device in the hierarchical topology, and (ii) a list of descendent computational devices;

each particular computational device in the plurality allocating a Contention Free Period (CFP) slot to each computational device in the plurality that is a direct descendent of the particular computational device to support communications between the respective particular computational device and the computational device that is the direct descendant of the particular computational device based on the list of interferers and the list of descendents of the particular computational device; and transmitting data from at least one of the particular computational devices in the plurality to one of the computational devices that is a direct descendant of the particular computational device during a corresponding allocated CFP slot.

2. The method according to claim 1, wherein, for each of the computational devices, updating the list of interferers Comprises removing descendents and ancestors from the list of interferers based on the list of descendents.

3. The method according to claim 1, wherein, for each of the computational devices, allocating the CFP slot comprises determining a CFP slot duration for each direct descendent of the computational device based on a local queue size of the direct descendent of the computational device and the list of interferers of the direct descendent of the computational device.

4. The method of claim 3, wherein determining a CFP slot duration comprises, for each descendent of the computational device, reporting to an immediate ancestor of the computational device the local queue sizes and the list of interferers of the descendent of the computational device.

5. The method of claim 1, wherein, for each of the computational devices, allocating the CFP slot comprises allocating time for each descendent to communicate with the descendant's parent and allocating time for each descendent to communicate with each descendant's descendent.

6. The method according to claim 1, wherein, for each of the Computational devices, allocating the CFP slot comprises allocating a dependent CFP slot to each direct descendent of the computational device based on an aggregate descendent queue size of the direct descendent of the computational device and the list of interferers of the direct descendent of the computational device, the dependent CFP slot being used for data transmission by descendents of the direct descendent to which the dependent CFP slot is allocated.

7. The method according to claim 1, wherein each of the computational devices allocating the CFP slot comprises prorating a duration of the CFP slot based upon an aggregate dependent queue size of each of the direct descendents of the computational device.

8. The method according to claim 1, further comprising each of the plurality of computational devices transmitting a CFP slot request to a parent node of the computational device from which the CFP slot request is transmitted.

9. The method according to claim 8, wherein the CFP slot request comprises at least one of: a local queue size, an aggregate descendent queue size and an External Interferers List (EIL) for each of the plurality of computational devices.

10. The method according to claim 1, wherein each computational device that is a descendent of the root node updates a list of interferers of itself and any computational device that is a descendent of itself and a list of descendents of itself and any computational device that is a descendent of itself by each of the plurality of computational devices transmitting the list of interferers periodically to a parent node of the computational device from which the list of interferers is transmitted.

11. The method according to claim 1, further comprising each of the plurality of computational devices allocating an independent CFP slot to at least two independent computational devices for simultaneous transmission of data, the at least two independent computational devices having descendents, none of which interfere with each other.

12. The method according to claim 1, further comprising coordinating a beacon propagation from the at least one root node across the hierarchical topology for synchronizing allocation of the CFP slot to each of the plurality of computational devices.

13. The method of claim 1, wherein:
a particular communication device updates a descendent list of all descendents, including direct descendents, for each descendent of the particular communication device,
the particular communication device receives from each descendent of the particular communication device an interferer list of all interferers of the descendent of the particular communication device,
the interferer list and the descendent list are different, the descendent list is used to remove descendents of the particular communication device present in the interferes list, and
the CFP slots of each descendent of the particular communication device are all allocated within the CFP slot of an immediate ancestor of the descendent.

14. A system suitable for data transmission in an ad-hoc wireless network, the ad-hoc wireless network comprising a plurality of computational devices, each of the plurality of computational devices comprising:
an organization device configured to organize the plurality of computational devices in a hierarchical topology, the hierarchical topology having at least one root node;
an interference detect device configured to update a list of interferers for each of the plurality of computational devices, the list of interferes comprising other computational devices that are within a wireless communication range but are not a parent computational device or a descendant computational device in the hierarchical topology;
a CFP allocation device configured to allocate a Contention Free Period (CFP) slot to each of the plurality of computational devices that is a direct descendent of the computational device to support communications between the computational device and each computational device that is the direct descendant of the computational device based on the list of interferers and a list of descendents of the computational device; and
a transmission device configured to transmit data to one of the computational devices that is a direct descendant of the computational device during a corresponding allocated CFP slot.

15. The system according to claim 14, wherein each of the computational devices is further configured to periodically transmit the list of interferers for each of the plurality of computational devices to a parent node of each of the plurality of computational devices according to a set of predefined rules, each of the plurality of computational devices further configured to periodically update the list of descendents of the computational device in which the network maintenance module is located.

16. The system according to claim 14, wherein each of the computational devices is further configured to periodically transmit the list of interferers for each of the plurality of computational devices to a parent node of each of the plurality of computational devices according to a set of predefined rules, each of the plurality of computational devices further configured to transmit a CFP slot request to a parent node of the computational device in which the CFP request module is located.

17. The system according to claim 14, wherein each of the computational devices is further configured to periodically transmit the list of interferers for each of the plurality of computational devices to a parent node of each of the plurality of computational devices according to a set of predefined rules, each of the plurality of computational devices further configured to determine a CFP slot duration and a dependent CFP slot duration for the computational device in which the CFP determination module is located.

18. The system according to claim 14, wherein each of the computational devices is further configured to periodically transmit the list of interferers for each of the plurality of computational devices to a parent node of each of the plurality of computational devices according to a set of predefined rules, each of the plurality of computational devices further configured to prorate a duration of the CFP slot based upon an aggregate queue size for each of the descendents of the computational device in which the scheduler module is located.

19. The system according to claim 14, wherein each of the computational devices is further configured to periodically transmit the list of interferers for each of the plurality of computational devices to a parent node of each of the plurality of computational devices according to a set of predefined rules, each of the plurality of computational devices further configured to coordinate a beacon propagation from the root node down the hierarchical topology for synchronizing allocation of the CFP slot allocation to each of the plurality of computational devices, the beacon propagation being based on a predefined timing rule.

20. In an ad-hoc wireless network comprising a hierarchy of computational devices that includes a root computational device having all remaining computational devices in the hierarchy as its descendents, a particular remaining computational device of the remaining computational devices configured to:

maintain a list of descendents of the particular remaining computational device;

maintain a periodically-updated list of interferers for the particular remaining computational device, interferers being computational devices in the ad-hoc network which are able to communicate with a particular computational device in the ad-hoc network and are not an ancestor or descendent of the particular computational device, the list of interferers of the particular remaining computational device containing the interferers of the particular remaining computational device as well as the interferers of all computational devices that are descendents of the particular remaining computational device;

allocate a Contention Free Period (CFP) slot between each parent/child computational device set forth in the hierarchy for future communications between the respective parent/child computational devices based upon the list of interferers and the list of descendents of the particular remaining computational device;

a calculate an Aggregate Descendent Queue Size (ADQS) for the particular remaining computational device, the ADQS being an aggregate of an independent CFP slot, dependent CFP slots and a sum of local queue sizes for the descendents of the particular remaining computational device; and provide a CFP request of the particular remaining computational device to a direct ancestor of the particular remaining computational device and a CFP slot allocation message containing information about each duration and timing offset of the CFP slot for each direct descendent to all direct descendents, the scheduler module and prorate the CFP slots if a duration of the CFP slot granted to the particular remaining computational device is shorter than the ADQS for the particular remaining computational device.

21. In an ad-hoc wireless network comprising a hierarchy of computational devices that includes a root computational device having all remaining computational devices in the hierarchy as its descendents, the root computational device configured to:

maintain a list of descendents of the root computational device;

an interference detect module that, if executed on the processor, maintains a periodically-updated list of interferers for the root computational device, interferers being computational devices in the ad-hoc network which are able to communicate with a particular computational device in the ad-hoc network and are not an ancestor or descendent of the particular computational device, the list of interferers of the root computational device also containing the interferers of the descendents of the root computational device;

allocate a Contention Free Period (CFP) slot between each parent/child computational device set forth in the hierarchy for future communications between the respective parent/child computational devices based upon the list of interferers and the list of descendents of the root computational device;

calculates an Aggregate Descendent Queue Size (ADQS) for the root computational device and schedules different branches of the hierarchy of computational devices whose computational devices do not interfere with each other to communicate at the same time such that no interferers communicate at the same time, the ADQS being an aggregate of an independent CFP Slot, dependent CFP slots and a sum of local queue sizes for the descendents of the root computational device; and provide a CFP slot allocation message containing information about each duration and timing offset of the CFP slot for each direct descendent to all direct descendents of the root computational device, and prorate the CFP slots if a duration of all available time to grant to all CFP slots is shorter than the ADQS for the root computational device.

* * * * *

UNITED STATES PATENT AND TRADEMARK OFFICE
CERTIFICATE OF CORRECTION

PATENT NO. : 8,149,737 B2  
APPLICATION NO. : 11/199783  
DATED : April 3, 2012  
INVENTOR(S) : Metke et al.

Page 1 of 1

It is certified that error appears in the above-identified patent and that said Letters Patent is hereby corrected as shown below:

In Column 12, Line 59, in Claim 2, delete "Comprises" and insert -- comprises --, therefor.

In Column 13, Lines 63-64, in Claim 13, delete "interferes" and insert -- interferers --, therefor.

In Column 14, Line 10, in Claim 14, delete "interferes" and insert -- interferers --, therefor.

In Column 15, Line 32, in Claim 20, delete "a calculate" and insert -- calculate --, therefor.

Signed and Sealed this
Twenty-fifth Day of December, 2012

David J. Kappos
*Director of the United States Patent and Trademark Office*